United States Patent
Yamane et al.

(10) Patent No.: US 6,329,662 B1
(45) Date of Patent: Dec. 11, 2001

(54) RADIATION IMAGE FORMING SYSTEM

(75) Inventors: Katsutoshi Yamane; Toshiki Fujiwara; Rikio Inoue, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/188,889

(22) Filed: Nov. 10, 1998

(30) Foreign Application Priority Data

Nov. 11, 1997 (JP) .................................................. 9-327089
Mar. 30, 1998 (JP) ................................................. 10-102227

(51) Int. Cl.$^7$ .................................................. G21K 4/00
(52) U.S. Cl. ............................. 250/483.1; 250/484.2; 250/484.4
(58) Field of Search ........................ 250/483.1, 484.2, 250/484.4, 302

(56) References Cited

U.S. PATENT DOCUMENTS

| | | | |
|---|---|---|---|
| 4,028,550 | * 6/1977 | Weiss et al. | 250/483.1 |
| 4,144,452 | * 3/1979 | Harte | 250/302 |
| 4,507,560 | * 3/1985 | Mathers et al. | 250/483.1 |
| 5,250,365 | * 10/1993 | Hedden et al. | 250/483.1 |
| 5,250,366 | * 10/1993 | Nakajima et al. | 250/483.1 |
| 5,430,302 | * 7/1995 | Torardi | 250/483.1 |
| 5,475,229 | * 12/1995 | Itabashi et al. | 250/483.1 |
| 5,639,400 | * 6/1997 | Roberts et al. | 250/483.1 |

* cited by examiner

Primary Examiner—Constantine Hannaher
Assistant Examiner—Otilia Gabor
(74) Attorney, Agent, or Firm—Sughrue, Mion, Zinn, Macpeak & Seas, PLLC

(57) ABSTRACT

A radiation image forming system utilizing a combination of a silver halide photographic material and radiographic intensifying screens is improved in its radiographic speed and sharpness of the resulting radiation image by employing a rare earth phosphor of the formula $M_wO_wX:M'$ (M is Y, La, Gd or Lu; X is a chalcogen atom or a halogen atom; M' is a rare earth atom which activates M; and w is 2 when X is a chalcogen atom or w is 1 when X is a halogen atom), incorporating into the intensifying screen a fluorescent dye or pigment which absorbs a portion of luminescence emitted by the phosphor and then emits light in a visible region, and employing a photographic material showing a cross-over of 10% or less when it is exposed to radiation in combination with the intensifying screens.

22 Claims, 6 Drawing Sheets

RADIATION IMAGE FORMING SYSTEM

FIELD OF THE INVENTION

The present invention relates to a radiation image forming system utilizing a combination which comprises a silver halide photographic material and a couple of radiographic intensifying screens. The invention also relates to a method for forming a radiation image or a radiographic image.

BACKGROUND OF THE INVENTION

In medical radiography such as X-ray photography, a "both-sided emulsion film type" silver halide photographic material (in which a photosensitive silver halide emulsion layer is provided on either side of a transparent support) is used and two radiographic intensifying screens are placed on both of the front and the back sides of the photographic material. A combination of the photographic material and the radiographic intensifying screens are then exposed to X-rays having passed through a patient. Such "both-sided photographic film system" is generally employed to obtain a radiation image of high quality with high sensitivity. However, the sharpness of the resultant image is often lowered by "cross-over light". The term of "cross-over light" means a visible light emitted by the radiographic intensifying screens which are placed on each side of the photographic material and then passes through the support of the photographic material to reach the photosensitive layer provided on the opposite side to deteriorate the sharpness. The deterioration thus caused by the cross-over light is referred to as "cross-over phenomenon".

In order to reduce the cross-over light (hereinafter, often referred to as simply "cross-over"), various studies on a silver halide photographic material (herenafter often referred to as "photographic material" or "photosensitive material") and a radiographic intensifying screen (hereinafter often referred to as "intensifying scree" or "screen") have been made.

As the studies on the photographic material, for example, Japanese Patent Provisional Publications No. H1-166031 and No. H1-172828 disclose a method using a mordant polymer and a method using a solid fine crystalline dye, respectively. In those methods, however, a considerably large amount of dye should be incorporated into the photographic material so as to satisfactorily reduce the cross-over light. Such large amount of dye is hardly removed rapidly in a development treatment. Therefore, into practically employable photographic materials, such large amount of dye cannot be incorporated. Further, if the dye is used in a large amount, an intensifying screen is liable to be stained with the dye transferred from the photographic material because the dye is insufficiently fixed to the photographic material. Although various dyes have been proposed to solve this problem, a satisfactory dye still has not been reported.

A method using an intensifying screen which can intercept the cross-over light is also proposed in, for example, WO 93-01521, EP 650089 and EP 592724. In the method, luminescence of phosphor is shifted to the ultraviolet region so as to reduce the cross-over light.

With respect to an intensifying screen containing $Gd_2O_2S$:Tb phosphor, various proposals are reported. Japanese Patent Provisional Publication No. 61-151534 discloses an intensifying screen in which a light-absorbing dye is contained and the phosphor is chosen so that a light emitted by the intensifying screen may comprise a green light component more than a blue light component. Each of Japanese Patent Provisional Publications No. 62-222200 and No. H4-155297 discloses a screen having differently colored phosphor layer to give an image of improved sharpness. RD83-22709 and RD82-218041 suggest that the sharpness of a resultant image can be improved by using a yellow dyesand/or a light-absorbing dye. Japanese Patent Publication No. 58-2640 teaches that the sharpness can be improved by applying a light-absorbing pigment onto the surface of phosphor layer. U.S. Pat. No. 4,362,944 proposes a surface protective layer which absorbs a part of the emitted light. Further, as an intensifying screen giving a low cross-over, an intensifying screen having a yellow-colored phosphor layer is commercially available (Eastman Kodak Co., Lanex Medium [trade name]). However, it appears to be indispensable that the dyes and/or pigments incorporated into an intensifying screen reduce sensitivity.

With respect to an intensifying screen containing a fluorescent dye or pigment, EP 0595089 reports that a phosphor which emits a ultraviolet light improves in corporation with fluorescent dyes the sensitivity. Further, DE 2807398 and DE 3143810 disclose intensifying screens using s fluorescent pigment in the form of fine particles.

Although various studies such as described above have been reported, it seems that there are no studies reporting that the cross-over of radiographic intensifying screens containing rare earth phosphors is well reduced using fluorescent dyes or pigments.

Under the circumstances, a radiation image-forming system giving a radiation image (or radiographic image) of high quality with high sensitivity (i.e., high radiographic speed) is highly desired, and accordingly it is desired to further improve both radiographic intensifying screens and photographic materials.

SUMMARY OF THE INVENTION

It is an object of the present invention to provide a combination for radiation image formation and a radiation image-forming system giving a radiation image of high sharpness with high sensitivity.

The inventors have studied on the radiographic intensifying screen utilizing a rare earth phosphor such as a terbium activated gadolinium oxysulfide phosphor, and have found that not only cross-over can be effectively reduced but also sensitivity (i.e., radiographic speed) can be remarkably enhanced by a combination of an intensifying screen containing a specific fluorescent dye or pigment and a specific photographic material.

A typical rare earth phosphor used in the invention emits luminescence having a main peak at approx. 545 nm, and a silver halide photographic material used in combination with the intensifying screen containing said phosphor is beforehand sensitized with a dye so as to become highly sensitive to a light of a wavelength around 545 nm. The fluorescent dye or pigment in the intensifying screen absorbs a portion of luminescence of the phosphor in the wavelength region shorter than 500 nm (light in this wavelength region mainly causes the cross-over phenomenon because the photographic material absorbs almost no light in that wavelength region) and then emits light in the wavelength region near the main peak of the luminescence (i.e., approx. 545 nm). The dye contained in the photographic material selectively absorbs a light in the wavelength region of longer than 500 nm to prevent the light from crossing over the support of photographic material to reach the photographic emulsion layer on the reverse side.

Accordingly, the present invention resides in a combination for radiation image formation which comprises a silver halide photographic material having a support and at least one silver halide emulsion layer provided on each side of the support, and two radiographic intensifying screens each having a support and at least one phosphor layer provided thereon, wherein the phosphor layer contains a rare earth phosphor represented by the following formula (I):

$$M_wO_wX:M' \quad (I)$$

in which M represents at least one rare earth atom selected from the group consisting of Y, La, Gd and Lu; X represents at least one chalcogen atom selected from the group consisting of S, Se and Te, or at least one halogen atom selected from the group consisting of F, Br, Cl and I; M' represents a rare earth atom which activates M; and w is 2 when X is a chalcogen atom or w is 1 when X is a halogen atom, the radiographic intensifying screen contains a fluorescent dye or pigment which absorbs a portion of luminescence emitted by the rare earth phosphor and then emits light in a visible region, and the photographic material shows a cross-over of 10% or less when it is exposed to radiation in combination with said intensifying screen.

said photographic material shows a cross-over of 10% or less when it is placed between the two radiographic intensifying screens and exposed to radiation.

The invention further resides in a radiation image-forming system comprising two radiographic intensifying screens each having a support and at least one phosphor layer provided thereon and a silver halide photographic material which is interposed between the two intensifying screens and has a support and at least one silver halide emulsion layer provided on each side of the support, wherein the phosphor layer contains a rare earth phosphor represented by the above-mentioned formula (I), the radiographic intensifying screen contains a fluorescent dye or pigment which absorbs a portion of luminescence emitted by the rare earth phosphor and then emits light in a visible region, and the photographic material shows a cross-over of 106% or less when it is exposed to radiation in the system.

The invention furthermore resides in a method for forming a radiation image which comprises the steps of:

forming a combination by placing a silver halide photographic material having a support and at least one silver halide emulsion layer provided on each side of the support between two radiographic intensifying screens each having a support and at least one phosphor layer provided thereon, said phosphor layer containing a rare earth phosphor represented by the aforementioned formula (I);

imagewise exposing the combination to X-ray radiation;

separating the exposed photographic material from the intensifying screens; and developing the exposed photographic material in a developing solution.

In the invention, the rare earth phosphor in the radiographic intensifying screen preferably is a terbium activated gadolinium oxysulfide phosphor. The terbium activated gadolinium oxysulfide phosphor preferably contains terbium atom in an amount of 0.001 to 0.02 mol. per 1 mol. of Gd.

The fluorescent dye or pigment preferably shows a light absorption peak in a wavelength region of shorter than 500 nm and an emission peak in the wavelength range of 450 to 600 nm under the condition that the wavelength of emission peak is longer than the wavelength of light absorption peak by at least 10 nm, preferably at least 20 nm. Also preferred is that the fluorescent dye or pigment shows a light absorption peak in a wavelength region of 400 to 490 nm and an emission peak in the wavelength range of 500 to 600 nm. The emission peak of the fluorescent dye or pigment preferably has a half-width of 100 nm or less.

The fluorescent dye or pigment in the radiographic intensifying screen preferably is a carbocyanine dye, a xanthene dye, a triarylmethane dye, a coumarin dye, a phthalimide compound, a naphthalimide compound, a diketopyrrolopyrrole compound or a perylene compound.

The fluorescent dye or pigment in the radiographic intensifying screen is preferably contained in the phosphor layer.

In the combination of the invention, the silver halide photographic material preferably contains a dye which shows a light absorption peak in the wavelength region of 500 to 600 nm. The dye in the silver halide photographic material is preferably provided between the support and the silver halide emulsion layer, in the form of a dye layer. Preferably, this dye is decolorizable in a developing process. Also preferred is that the dye shows an absorption coefficient at 550 nm which is twice or more larger than that at 450 nm. The decolorizable dye preferably is in the form of solid fine particles.

DETAILED DESCRIPTION OF THE INVENTION

First, a radiographic intensifying screen employed for the combination of the invention is explained in detail.

The radiographic intensifying screen according to the invention comprises a support and one or more phosphor layers provided thereon, and may have the same structure as a known intensifying screen. For example, a light-reflecting layer and/or a light-absorbing layer may be provided between the support and the phosphor layer. Preferably, a surface protective layer is provided on the phosphor layer. The fluorescent dye or pigment can be incorporated in any layer of the intensifying screen, but is preferably incorporated into the phosphor layer or the surface protective layer (particularly preferably into the phosphor layer) so that it can work effectively.

The phosphor contained in the phosphor layer is a rare earth phosphor represented by the following formula (I):

$$M_wO_wX:M' \quad (I)$$

in which M represents at least one rare earth atom selected from the group consisting of Y, La, Gd and Lu; X represents at least one chalcogen atom selected from the group consisting of S, Se and Te, or at least one halogen atom selected from the group consisting of F, Br, Cl and I; M' represents a rare earth atom activating M; and w is 2 when X is chalcogen or w is 1 when X is halogen.

In the formula (I), M' preferably is Dy, Er, Eu, Ho, Nd, Pr, Sm, Ce, Th, Tm and/or Yb, more preferably is Tb. The content of M' preferably is in the range of 0.0002 to 0.2 mol, more preferably 0.0005 to 0.05 mol, particularly preferably 0.001 to 0.02 mol, per 1 mol of M. The rare earth phosphor of the formula (I) may include a small amount of additives for improving certain properties and/or those for modifying the surface condition (such as silica and alumina). Concrete examples of the rare earth phosphors of the formula (I) are as follows: terbium activated rare earth oxysulfide phosphors [e.g., $Y_2O_2S:Tb$, $Gd_2O_2S:Tb$, $La_2O_2S:Tb$, $(Y,Gd)_2O_2S:Tb$, and $(Y,Gd)_2O_2S:Tb$, Tm]; terbium activated rare earth oxyhalide phosphors [e.g., LaOBr:Tb, LaOBr:Tb,Tm, LaOCl:Tb, LaOCl:Tb,Tm, GdOBr:Tb, and GdOCl:Tb]; and thulium activated rare earth oxyhalide phosphors [e.g., LaOBr:Tm and LaOCl:Tm]. Particularly preferred is a terbium activated gadolinium oxysulfide phosphor ($Gd_2O_2S:Tb$). In the phosphor of $Gd_2O_2S:Tb$, a portion of Gd (less than 50 atomic %) can be substituted with Y, La and/or Lu. Further, additives such as Ho may be included in an amount of less than 10 atomic % and the compound such as silica and alumina may be also incorporated to modify the surface condition of the phosphor. U.S. Pat. No. 3,725,704 gives a detailed description of $Gd_2O_2S:Tb$.

Figure 2:
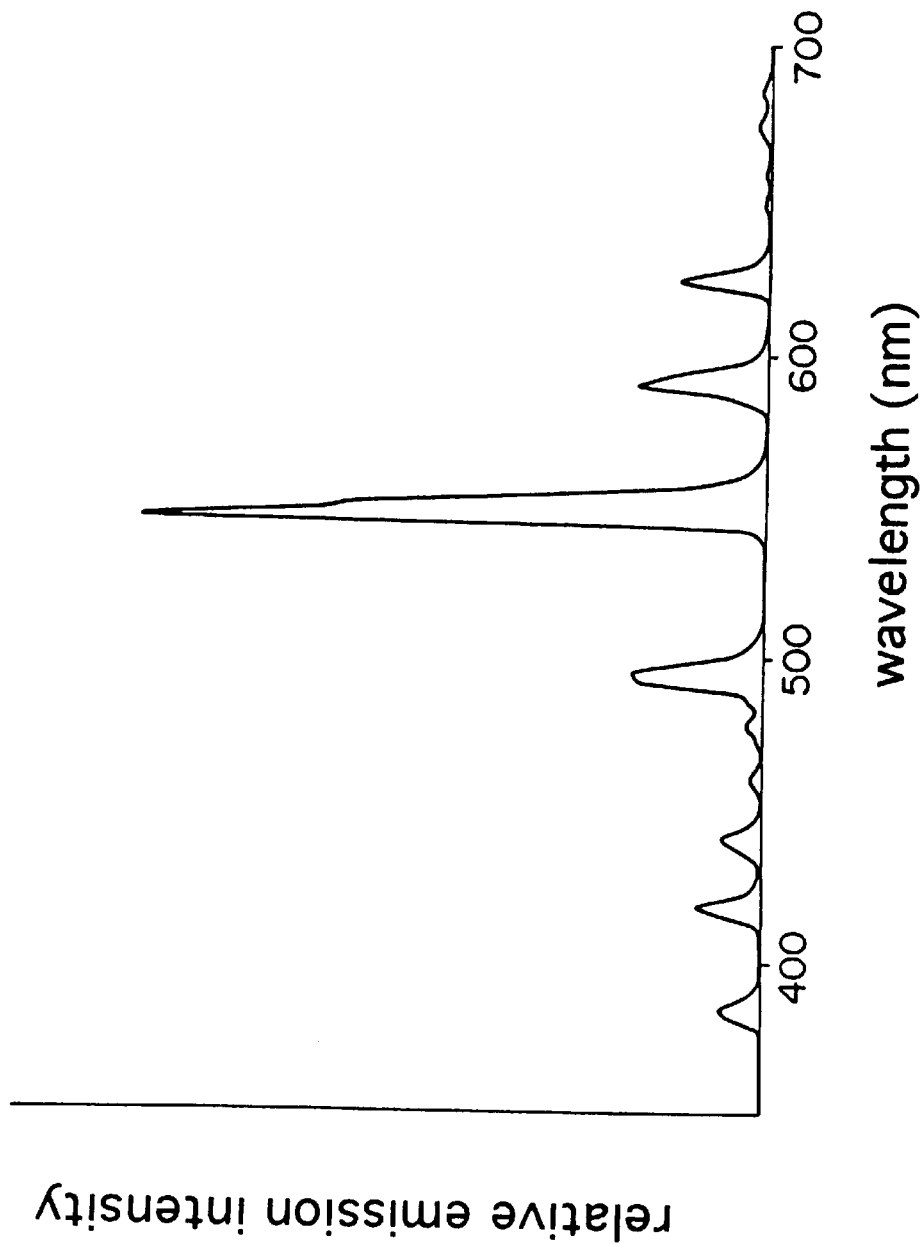
FIG. 2 shows an emission spectrum of a radiographic intensifying screen for comparison which contains no fluorescent dye.

FIG. 2 shows an emission spectrum of $Gd_2O_2S:Tb$ which is observed when excited with X-ray (40 KVp, tungsten target tube). According to FIG. 2, $Gd_2O_2S:Tb$ exhibits not only a main emission peak at approx. 545 nm but also plural emission peaks in the wavelength region of 380 to 500 nm.

The fluorescent dye or pigment employed for the invention absorbs a portion of the luminescence of the phosphor, and then emits a light in the visible region. For example, in the case that the phosphor is $Gd_2O_2S:Tb$, the fluorescent dye or pigment absorbs a luminescence in the wavelength range of lower than approx. 545 nm, and then emits a light at approx. 545 nm. Preferably, the dye or pigment absorbs a luminescence in the wavelength region shorter than 500 nm, and then emits a light whose spectrum has a peak in the wavelength region of 450 to 600 nm, more preferably 490 to 600 nm, and more preferably 500 to 570 nm, under the condition that the wavelength of emission peak is longer than the wavelength of light absorption peak by at least 10 nm. The half-width of the light emitted by the fluorescent dye or pigment preferably is not more than 100 nm, more preferably not more than 80 nm, most preferably not more than 70 nm.

The fluorescent dye or pigment converts a blue component (which causes the cross-over phenomenon) of the luminescence into a light near the maximum peak (which makes radiographic images) of the luminescence of the phosphor, and thereby effectively reduces the cross-over and remarkably enhances the sensitivity of the radiographic combination of the invention.

It is preferred for the fluorescent dye or pigment of the invention to exhibit a high quantum yield. The quantum yield is defined by the following formula:

Quantum yield (%)=(number of emitted photons/number of absorbed photons)×100.

A fluorescent dye or pigment having a higher quantum yield is preferred. The quantum yield of the dye or pigment preferably is not lower than 20%, more preferably not lower than 40%, most preferably not lower than 60%.

There are no specific restrictions on substances used as the fluorescent dye or pigment, and hence it may be an inorganic compound or an organic compound. In the case that the fluorescent dye or pigment is incorporated into the phosphor layer, the particle size of the dye or pigment preferably is small and is usually in the range of less than 2 μm, preferably less than 1 μm so as not to lower the packing density of the rare earth phosphor. Further, it is also preferred for the fluorescent dye or pigment not to agglomerate in the intensifying screen. For this reason, the fluorescent dye or pigment preferably exhibits a high quantum yield even in the form of small particles, and therefore an organic fluorescent dye or pigment is preferably used.

As the fluorescent dye or pigment, known dyes and pigments are employable. Appropriate dyes and pigments are described in, for example, "Senryo Binran (Dye Handbook, in the Japanese language)" (pp. 315–1109, 1970, edited by Yukigosei-Kyokai) and "Shikizai-Kogaku Handbook (Dye Technology Handbook in the Japanese language)" (pp. 225–417, 1989, edited by Shikizai-kyokai). In "Laser dyes" (written by Mistuo Maeda, 1984, published by Academic Press), particularly preferred dyes are described. Examples of the preferred dyes include carbocyanine dyes (shown in Table 4 on pp. 26–29 of "Laser dyes"); phthalocyanine dyes (shown in Table 11 on pp. 74–75); xanthene dyes (shown in Table 12 on pp. 76–105); triarylmethane dyes (shown in Table 13 on pp. 106); acridine dyes (shown in Table 14 on pp. 107–110); condensed ring compounds (shown in Table 18 on pp. 137–149); coumarin and azacoumarin dyes (shown in Table 23 on pp. 189–238); quinolone and azaquinolone dyes (shown in Table 25 on pp. 239–246); oxazole and benzoxazole compounds (shown in Table 26 on pp. 247–261); furan and benzofuran compounds (shown in Table 29 on pp. 273–275); pyrazoline compounds (shown in Table 30 on pp. 276); phthalimido and naphthalimide compounds (shown in Table 31 on pp. 277); peteridine compounds (shown in Table 32 on pp. 282); and pyrylium, phosphorine, boradiazinium and pyridine compounds (shown in Table 33 on pp. 283). Further, diketopyrrolopyrrole compounds (described in Japanese Patent Provisional Publication No. 58-210084) and perylene compounds (described in Japanese Patent Provisional Publication No. H7-188178) are also preferred.

The fluorescent dye or pigment preferably exhibits both an absorption spectrum having a maximum peak in the wavelength region of 350 to 500 nm and a fluorescence (emission) spectrum having a maximum peak in the wavelength region of 500 to 600 nm. More preferably, the maximum of the absorption spectrum is in the wavelength region of 400 to 490 nm and that of the fluorescence spectrum is in the wavelength region of 500 to 600 nm. Most preferably, the maximum of the absorption spectrum is in the wavelength region of 400 to 490 nm and that of the fluorescence spectrum is in the wavelength region of 500 to 570 nm. Therefore, carbocyanine dyes, xanthene dyes, triarylmethane dyes, acridine dyes, coumarin or azacoumarin dyes, phthalimido or naphthalimide compounds, pyrylium compounds, diketopyrrolopyrrole compounds or perylene compounds are preferred. The maximum peak of the fluorescence spectrum most preferably is in the wavelength region of 500 to 555 nm. Accordingly, carbocyanine dyes, xanthene dyes, triarylmethane dyes, coumarin dyes, phthalimido or naphthalimide compounds, diketopyrrolopyrrole compounds or perylene compounds are most preferred.

The fluorescent dye or pigment preferably gives almost no (or very short) afterglow, and its fluorescence lifetime preferably is not longer than $10^{-2}$ second. It is further preferred that the fluorescent dye or pigment is hardly decomposed with heat, light or lapse of time.

Concrete examples of the fluorescent dye or pigment employable for the invention are given below, but those examples by no means restrict the invention.

| No. | R¹ | R² | R³ | R⁴ | X⁻ |
|-----|------|--------|---------|---|------|
| 5 | OCH₃ | H | COOH | H | Cl |
| 6 | OCH₃ | C₆H₁₃ | COOH | H | Cl |
| 7 | NH₂ | H | COOH | H | Cl |
| 8 | N(C₂H₅)₂ | H | COOH | H | ClO₄ |
| 9 | OCH₃ | C₆H₁₃ | COOC₂H₅ | H | BF₆ |

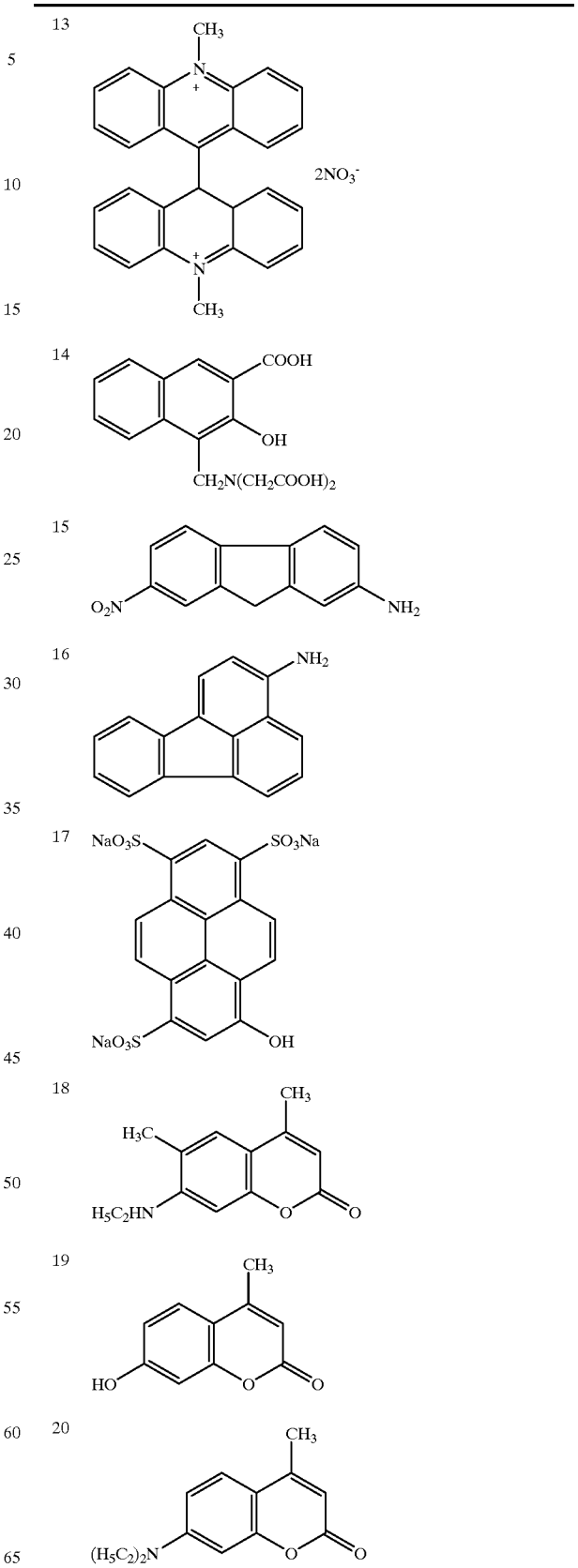

-continued
21 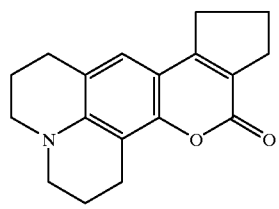
22 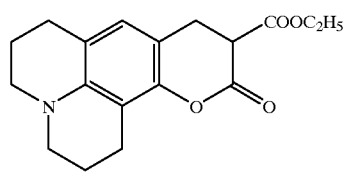
23 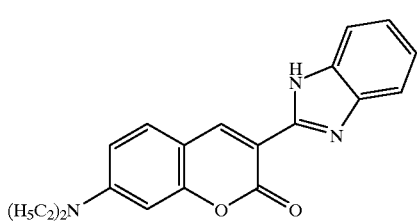
24 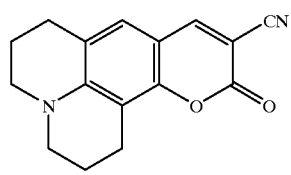
25 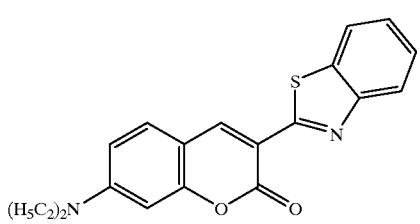
26 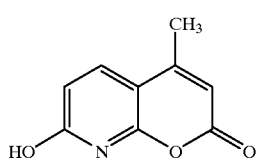
27 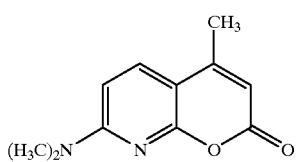
-continued
28 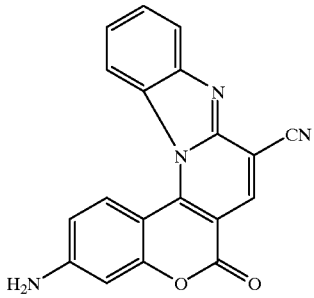
29 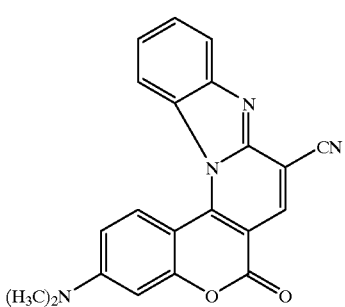
30 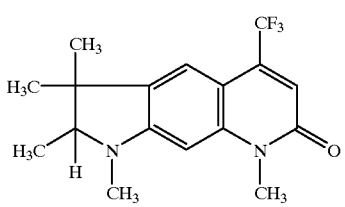
31 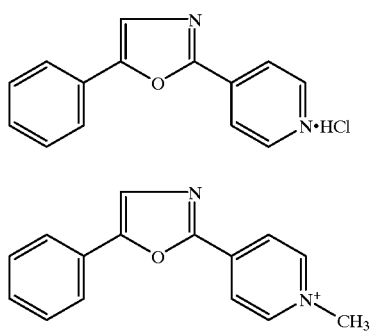
32 
33 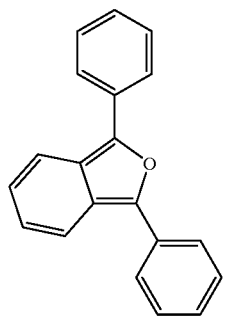

-continued
34
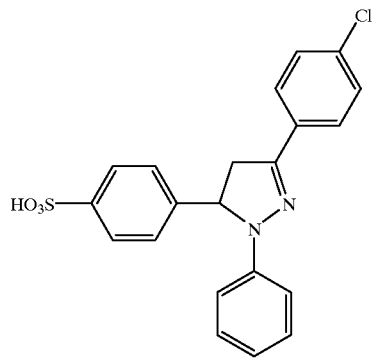
35
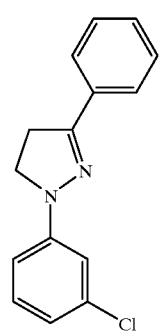
36
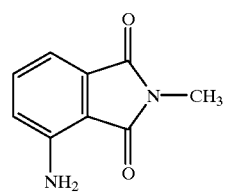
37
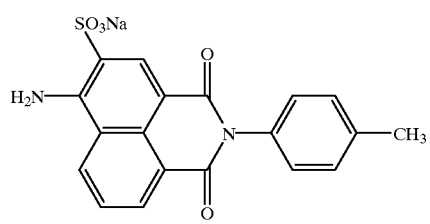
38
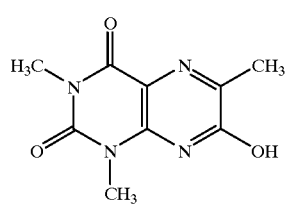
39
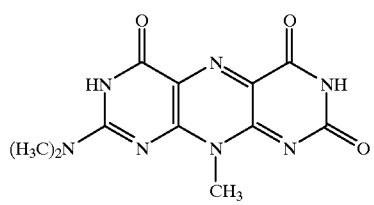
-continued
40
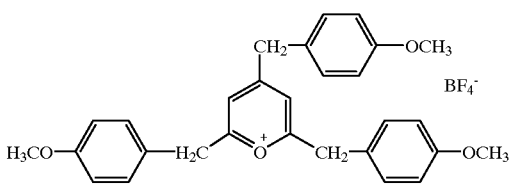
41
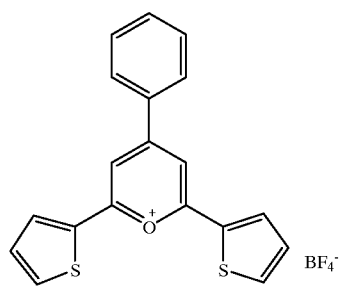
42
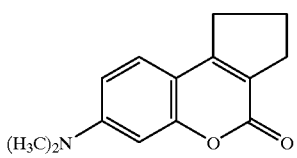
43
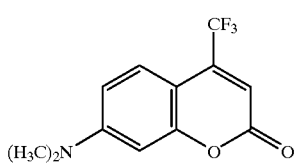
44
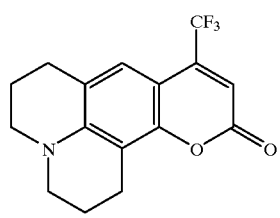
45
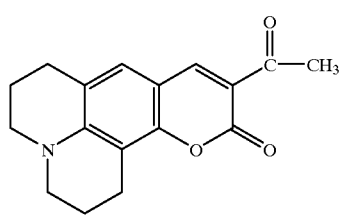
46
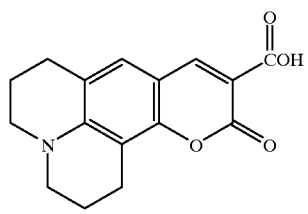

-continued
47
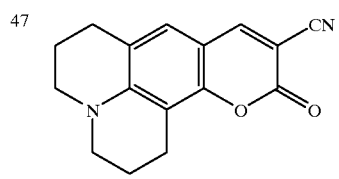
48
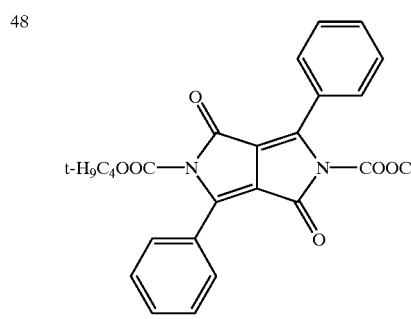
49
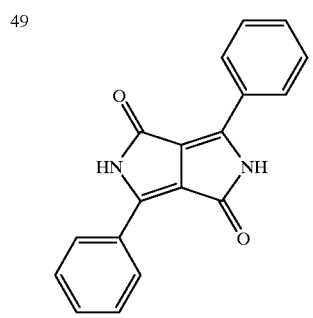
50
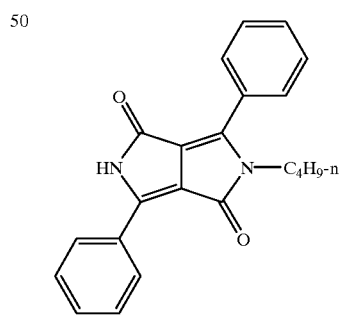
51
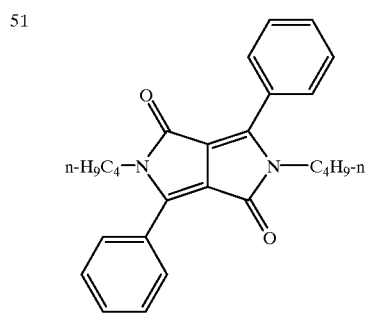
-continued
5
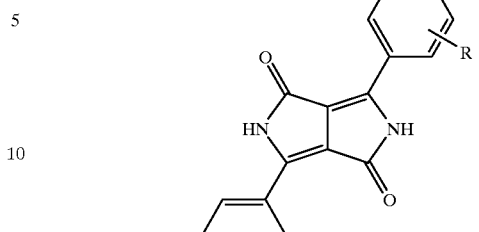
| 52 | R = m-CF$_3$ |
|---|---|
| 53 | m-Cl |
| 54 | p-Br |
| 55 | p-N(CH$_3$)$_2$ |
| 56 | p-N(C$_2$H$_5$)$_2$ |
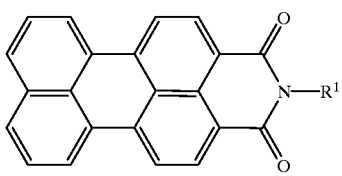
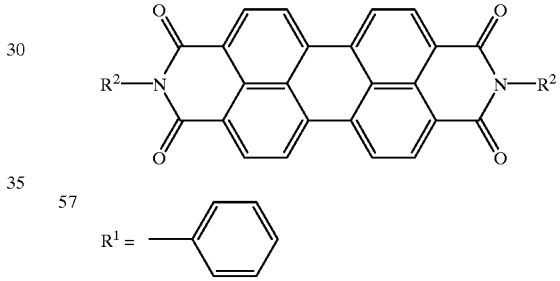
57  R$^1$ = 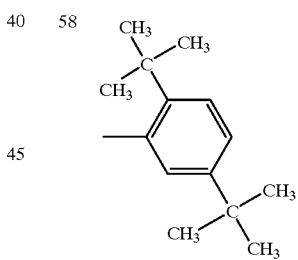
58 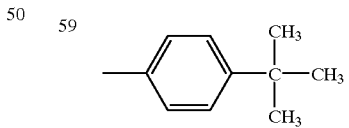
59 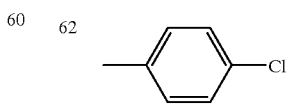
60 —CH$_3$
61 —C$_2$H$_5$
62

-continued

63 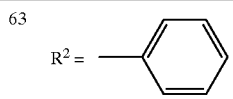

64 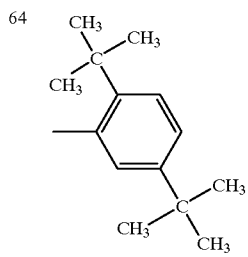

65 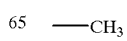

66 —C$_2$H$_5$

67 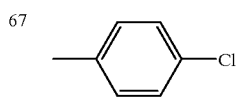

The phosphor layer can be formed, for example, in the following manner. The above-described phosphor particles and, if the fluorescent dye or pigment is to be incorporated into the phosphor layer, the particles of the fluorescent dye or pigment are dispersed in an organic solvent together with a binder resin, to prepare a coating dispersion. The coating dispersion is then coated over the support (or over an undercoating layer such as light-reflecting layer beforehand provided on the support), and dried to form a phosphor layer. Besides the above method, the phosphor layer may be formed by the steps of coating the above dispersion on a temporary support, drying the coated dispersion to form a phosphor sheet, peeling off the sheet, and fixing the sheet onto a permanent support with an adhesive.

The size of the phosphor particles is not specifically restricted, but is usually in the range of approx. 1 to 15 μm, preferably approx. 2 to 10 μm. Preferably, the phosphor particles are highly packed in the phosphor layer, and the volume filling content of the phosphor is usually in the range of 60 to 85%, preferably 65 to 80%, more preferably 68 to 75%. The content of the phosphor particles in the phosphor layer is usually not less than 80 wt. %, preferably not less than 90 wt. %, more preferably not less than 95 wt. %. The fluorescent dye or pigment is usually used in an amount of 0.1 to 5,000 mg, preferably 1 to 1,000 mg, more preferably 5 to 500 mg per 1 kg of the phosphor. Many known publications and references describe binder resins, organic solvents and various additives employable for the phosphor layer of the intensifying screen. The thickness of the phosphor layer can be set according to the target sensitivity, but preferably is 70 to 150 μm for a front side screen or 80 to 400 μm for a back side screen. The X-ray absorption efficiency depends on the amount of the phosphor particles in the phosphor layer.

The phosphor layer may be a single layer or may have multi-layered structure. Preferably, the phosphor layer consists of one to three component layers, and more preferably consists of one or two component layers. For example, the phosphor layer may consist of plural component layers each of which contains the phosphor particles of different size. In that case, the size of the phosphor particles contained in each component layer may gradually increase from the bottom component layer (layer provided next to the support) to the top component layer. In this phosphor layer, the more deeply a component layer is provided, the smaller particles it contains. Otherwise, the phosphor layer may contain a mixture of phosphor particles having different sizes. Further, the size distribution of the phosphor particles may vary in the depth direction of the phosphor layer (Japanese Patent Publication No. 55-33560). For example, in the case that Gd$_2$O$_2$S:Tb phosphor (whose variation coefficient of size distribution is usually in the range of 30 to 50%) is employed, mono-dispersive particles (whose variation coefficient is not more than 30%) are preferably used.

The support of the intensifying screen can be optionally selected from those employed in the conventional radiographic intensifying screens. Examples of the supports include polymer films containing a white pigment (e.g., titanium dioxide) or a black pigment (e.g., carbon black).

The phosphor layer may be directly provided on the surface of the support, or the phosphor layer may be provided via an undercoating layer such as a light-reflecting layer containing light-reflecting material (e.g., titanium dioxide). For example, Examples 1 and 2 in Japanese Patent Provisional Publication No. H9-21899 disclose a light-reflecting layer preferably employable for the intensifying screen of the invention. The light-reflecting layer contains titanium dioxide (mean particle size: 0.1 to 0.5 μm) in a volume filling content of 10 to 75%, and the thickness is in the range of 10 to 100 μm.

On the phosphor layer, the surface protective layer is preferably formed. The surface protective layer preferably exhibits scattering with a scattering length of 5 to 80 μm observed at a maximum wavelength of the luminescence emitted by the phosphor. The scattering length more preferably is in the range of 10 to 70 μm, most preferably 10 to 60 μm. In this specification, the word "scattering length" indicates a mean distance in which a light travels straight until it is scattered, and therefore a short scattering length means that the layer highly scatters a light. On the other hand, the absorption length (which indicates a mean distance in which a light travels straight until it is absorbed) of the surface protective layer is not restricted. From the viewpoint of sensitivity of the intensifying screen, it is preferred for the protective layer not to absorb a light. However, in order to make up for shortage of the scattering, the surface protective layer may be made to slightly absorb a light. The absorption length preferably is more than 800 μm, more preferably more than 1,200 μm. In accordance with Kubeluka-Munk theory, the scattering length and the absorption length can be calculated from the data obtained in the following measurement.

First, three or more film samples are prepared. Each film sample has a different thickness, but made of the same components as the target surface protective layer. The thickness (μm) and the diffuse transmittance (%) of each sample are then measured. The diffuse transmittance (%) can be measured by means of a spectrophotometer equipped with an integrating sphere. In the below-described examples of the present specification, an automatic recording spectrophotometer (U-3210, manufactured by HITACHI, Ltd.) equipped with an integrating sphere of 150 φ (150-0910) is used. The diffuse transmittance must be measured at the wavelength corresponding to the maximum peak of the luminescence emitted by the phosphor contained in the phosphor layer on which the target surface protective layer is provided.

From the thickness (μm) and the diffuse transmittance (%) obtained in the above measurements, the scattering length is calculated in accordance with the following formula (A) which is derived from Kubeluka-Munk theory. The formula (A) can be easily derived, under the boundary condition of the diffuse transmittance (%), from the formulas 5.1.12 to 5.1.15 described in "Keikotai Handbook [in Japanese, Handbook of phosphor]", published by Ohm-sha, 1987, pp.403.

Formula (A):

$$T/100=4\beta/[(1+\beta)^2 \cdot \exp(\alpha d)-(1-\beta)^2 \cdot \exp(-\alpha d)]$$

in which T represents a diffuse transmittance (%), d represents a thickness (μm), and $\alpha$ and $\beta$ are defined by the formulas: $\alpha=[K(K+2S)]^{1/2}$ and $\beta=[K/(K+2S)]^{1/2}$, respectively.

The formula (A) is applied to the measured T (diffuse transmittance) and d (thickness) of each film sample, and thereby the values of K and S are determined. The scattering length (μm) and the absorption length (μm) described above are values defined by 1/S and 1/K, respectively.

The surface protective layer preferably contains light-scattering fine particles dispersed in a binder resin. The refractive index of the light-scattering fine particles generally is more than 1.6, preferably more than 1.9, and the particle size generally is in the range of 0.1 to 1 μm. Examples of the light-scattering fine particles include fine particles of magnesium oxide, zinc oxide, zinc sulfide, titanium dioxide, niobium oxide, barium sulfate, lead carbonate, silicon dioxide, poly(methyl methacrylate), styrene, and melamine. Preferred are zinc oxide, zinc sulfide, titanium oxide and lead carbonate, because they have a high refractive index. Titanium dioxide of anatase type is particularly preferred.

The binder resin employable for the surface protective layer is not specifically restricted, and examples of the binders include polyethylene terephthalate, polyethylene naphthalate, polyamide, aramid, fluorocarbon resins and polyesters.

The surface protective layer can be formed by the steps of dispersing the light-scattering particles in an organic solution of the binder resin to prepare a coating liquid, coating the liquid on the phosphor layer directly or via an optionally provided auxiliary layer, and then drying the coated liquid to form a protective layer. The surface protective layer may be formed by other steps, namely, coating the above liquid on a temporary support, drying the coated liquid to form a protective sheet, peeling off the protective sheet from the temporary support, and then placing the protective sheet with an adhesive on the phosphor layer. The thickness generally is in the range of 2 to 12 μm, preferably 3.5 to 10 μm. The aforementioned fluorescent dye or pigment may be incorporated into the coating liquid to prepare a surface protective layer containing the fluorescent dye of pigment.

With respect to the process for producing intensifying screens and materials preferably employed for the invention, reference is made to various publications (e.g., Japanese Patent Provisional Publications No. H9-21899 and No. H6-347598).

The silver halide photographic material employed for the radiation image forming combination of the invention is now explained in detail.

The photographic material gives a cross-over in a degree of not more than 10%, preferably not more than 8% in the radiographic process. In the present specification, the degree (value) of cross-over is determined in the following manner.

First, an intensifying screen and a "both-sided emulsion type" photographic material (having an emulsion layer on both sides) are prepared. The photographic material is placed in contact with the front surface of the screen, and then a sheet of black paper is further placed on the front side (i.e., the side other than at in contact with the scree n) of the photographic material. In this arrangement, the photographic material is exposed to X-rays with different doses (which are adjusted by varying the distance between the intensifying screen and the focal spot of the X-ray generator). The exposed material is developed, and then the developed material is divided into two samples. From one sample is removed an emulsion layer which has been in contact with the intensifying screen. From another sample is removed an emulsion layer which has not been in contact with the intensifying screen. The optical density of the emulsion layer remaining on the support is measured and plotted against the corresponding dose to obtain a characteristic curve. Based on thus obtained characteristic curve for the emulsion layer remaining on each support, the average sensitivity difference ($\Delta$logE) is estimated from the liner part of the curve, and the degree of cross-over is calculated in accordance with the following formula:

cross-over (%)=100/[antilog($\Delta$logE)+1].

In the present invention, in order to reduce the cross-over to 10% or below, the photographic material preferably contains a dye whose absorption spectrum exhibits both the maximum peak in the wave length region of 500 to 600 nm and the absorption coefficient at 550 nm twice or more larger than that at 450 nm. More preferably, the absorption coefficient at 550 nm is three times or more larger than that at 450 nm. In the conventional screen containing $Gd_2O_2S$:Tb phosphor, the incorporated dye must absorb a light not only at the wavelength of the luminescence maximum (approx. 545 nm) but also in the wavelength region of 380 to 570 nm in order to sufficiently reduce the cross-over. In the combination of the invention, however, even if the dye has a small absorption coefficient in a short wavelength region (not longer than 500 nm), the cross-over can be sufficiently reduced. Further, a light in the wavelength region of 500 to 600 nm can be effectively absorbed by the above-mentioned dye, and accordingly the cross-over can be efficiently reduced in a relatively small amount of the dye.

There is no specific restriction on the process for producing a photographic material containing a dye having a relatively sharp absorption peak in the wavelength region of 500 to 600 nm, and hence various methods are employable. For example, the dye is adsorbed on silver halide fine particles so as to exhibit a sharp absorption peak, and then a coating liquid containing the particles thus treated with the dye is coated on an undercoating layer (Japanese Patent Provisional Publication No. H2-29641). Otherwise, the dye may be adsorbed on transparent inorganic material such as mica so as to exhibit a sharp absorption peak, and then incorporated into a photographic material. A particularly preferred method is described in Japanese Patent Provisional Publication No. H1-172828. In the method, solid fine particles of a dye which can be decolorized in the developing process is dispersed and fixed in the emulsion layer. The "dye which can be decolorized in the developing process" here means a dye which sufficiently absorbs a light before the developing process but whose absorbance in the visible region lowers to 0.4 or less, preferably 0.25 or less after the developing, fixing, and washing (including stabilizing) processes.

With respect to the dye which can be decolorized in the developing process, a detailed description is given below.

As the above dyes, known dyes or pigments such as compounds described in "Senryo Binran (Dye Handbook, in the Japanese language)" (pp. 315–1109, 1970, edited by Yukigosei-Kyoukai) or "Shikizai-Kogaku Handbook (Dye Technical Handbook, in the Japanese language)" (pp. 225–417, 1989, edited by Shikizai-kyokai) can be used. Preferred are dyes represented by the following formula (FA):

$$D\text{-}(X_1)_{y1}. \tag{FA}$$

In the formula (FA), D represents a group derived from a compound having chromophore. $X_1$ represents a dissociative proton connecting to D directly or via a divalent connecting group; or otherwise $X_1$ represents a group having a dissociative proton. In the case that the dissociative proton is attached to D via a divalent connecting group, $X_1$ includes the connecting group. In the formula (FA), $y^1$ represents an integer of 1 to 7.

The compound having chromophore (from which D is derived) can be optionally selected from various known dye compounds. Examples of the dye compounds include oxonol dyes, merocyanine dyes, cyanine dyes, arylidene dyes, azomethine dyes, triphenylmethane dyes, azo dyes, anthraquinone dyes, and indoaniline dyes.

When the compound of the formula (FA) is incorporated into a photographic material, $X_1$ (group having a dissociative proton or a dissociative proton which may have a connecting group) does not dissociate and hence the compound is substantially insoluble in water. During the process for developing the material (i.e., during the developing process), however, $X_1$ dissociates to make a compound substantially soluble in water. Examples of the group represented by $X_1$ include carboxylic acid groups, sulfonamide groups, arylsulfamoyl groups, sulfonylcarbamoyl group, carbonylsulfamoyl group, enol group of oxonol dye, and phenolic hydroxyl group.

Examples of the compounds represented by the formula (FA) preferably employed for the invention include those of the following formulas (FA1), (FA2) and (FA3):

$$A_1 = L_1 - (L_2 = L_3)_m - Q \tag{FA1}$$

$$A_1 = L_1 - (L_2 = L_3)_n - A_2 \tag{FA2}$$

$$A_1 = (L_1 - L_2)_k = B_1 \tag{FA3}.$$

In the above formulas, each of $A_1$ and $A_2$ represents an acidic nucleus. $B_1$ represents a basic nucleus and Q represents an aryl group or a heterocyclic group. Each of $L_1$, $L_2$ and $L_3$ represents a methine group, "m" is 0, 1 or 2, and each of "n" and "k" is 0, 1, 2 or 3. The compound represented by the formula (FA1), (FA2) or (FA3) contains at least one group selected from the group consisting of carboxylic acid group, sulfonamide group, arylsulfamoyl group, sulfonylcarbamoyl group, carbonylsulfamoyl group, enol group of oxonol dye, and phenolic hydroxyl group. However, the compound does not contain water-soluble groups (e.g., sulfonic acid group, phosphoric acid group) other than the above groups.

The acidic nucleus represented by $A_1$ or $A_2$ preferably is a cyclic ketomethylene compound or a compound having a methylene group placed between electron attractive groups.

Examples of the cyclic ketomethylene compounds include 2-pyrazoline-5-one, rhodanine, hydantoin, thiohydantoin, 2,4-oxazolidinedione, isooxazolone, barbituric acid, thiobarbituric acid, indandione, dioxopyrazolopyridine, hydroxypyridone, pyrazolidinedione, and 2,5-dihydrofuran-2-one. Those compounds may have substituent groups.

The compound having a methylene group placed between electron attractive groups can be represented by the following formula: $Z_1CH_2Z_2$. In the formula, each of $Z_1$ and $Z_2$ represents $-CN$, $-SO_2R_1$, $-COR_1$, $-COOR_2$, $-CONHR_2$, $-SO_2NHR_2$, $-C[=C(CN)_2]R_1$ or $-C[=C(CN)_2]NHR_1$. In the formula, $R_1$ represents an alkyl group, an aryl group or a heterocyclic group, and $R_2$ represents hydrogen atom or the groups represented by $R_1$. The above groups may have substituent groups.

Examples of the basic nuclea represented by $B_1$ include pyridine, quinoline, indolenine, oxazole, imidazole, thiazole, benzooxazole, benzoimidazole, benzothiazole, oxazoline, naphthooxazole, and pyrrole. Those compounds may have substituent groups.

Examples of the aryl groups represented by Q include phenyl and naphthyl. Those compounds may have substituent groups. Examples of the heterocyclic groups represented by Q include pyrrole, indole, furan, thiophene, imidazole, pyrazole, indolizine, quinoline, carbazole, phenothiazine, phenoxazine, indoline, thiazole, pyridine, pyridazine, thiadiazine, pyran, thiopyran, oxadiazole, benzoquinoline, thiazoazole, pyrrolothiazole, pyrrolopyridazine, tetrazole, oxazole, coumarin, and coumarone. Those compounds may have substituent groups.

The methine group represented by $L_1$, $L_2$ or $L_3$ may have substituent groups, and the substituent groups may be combined with each other to form a five- or six-membered ring (e.g., cyclopentene and cyclohexene).

The substituent groups that the above-mentioned compounds or groups may have are not restricted unless they make the compounds of the formula (FA) [(FA1), (FA2) or (FA3)] substantially soluble in water of pH 5 to pH 7. Examples of the substituent groups include carboxylic acid group, sulfonamide group having 1–10 carbon atoms (e.g., methanesulfonamide, benzenesulfonamide, butanesulfonamide, and n-octanesulfonamide), sulfamoyl group having 0–10 carbon atoms (e.g., unsubstituted sulfamoyl, methylsulfamoyl, phenylsulfamoyl, and butylsulfamoyl), sulfonylcarbamoyl group having 2–10 carbon atoms (e.g., methanesulfonylcarbamoyl, propanesulfonylcarbamoyl, and benzenesulfonylcarbamoyl), acylsulfamoyl group having 1–10 carbon atoms (e.g., acetylsulfamoyl, propionylsulfamoyl, pivaloylsulfamoyl, and benzoylsulfamoyl), linear or cyclic alkyl group having 1–8 carbon atoms (e.g., methyl, ethyl, isopropyl, butyl, hexyl, cyclopropyl, cyclopentyl, cyclohexyl, 2-hydroxyethyl, 4-carboxybutyl, 2-methoxyethyl, benzyl, phenetyl, 4-carboxybenzyl, and 2-diethylaminoethyl), alkenyl group having 2–8 carbon atoms (e.g., vinyl, allyl), alkoxy group having 1–8 carbon atoms (e.g., methoxy, ethoxy, butoxy), halogen atom (e.g., F, Cl, Br), amino acid group having 0–10 carbon atoms (e.g., unsubstituted dimethylamino, diethylamino, and carboxyethylamino), alkoxycarbonyl group having 2–10 carbon atoms (e.g., methoxycarbonyl), amide group having 1–10 carbon atoms (e.g., acetylamino and benzamide), carbamoyl group having 1–10 carbon atoms (e.g., unsubstituted carbamoyl, methylcarbamoyl, and ethylcarbamoyl), aryl group having 6–10 carbon atoms (e.g., phenyl, naphthyl, 4-carboxyphenyl, 3-carboxyphenyl, 3,5-dicarboxyphenyl, 4-methanesulfonamidophenyl, an 4-butanesulfonamidophenyl), aryloxy group having 6–10 carbon atoms (e.g., phenoxy, 4-carboxyphenoxy, 3-methylphenoxy, and naphthoxy), alkylthio group having 1–8 carbon atoms (e.g., methylthio, ethylthio, and octylthio), arylthio group having 6–10 carbon atoms (e.g., phenylthio and naphthylthio), acyl group having 1–10 carbon atoms (e.g., acetyl, benzoyl, and propanoyl), sulfonyl group having 1–10 carbon atoms (e.g., methanesulfonyl and benzenesulfonyl), ureido group having 1–10 carbon atoms (e.g., ureido and methylureido), urethane group having 2–10 carbon atoms (e.g., methoxycarbonylamino and ethoxycarbonylamino), cyano group, hydroxyl group, nitro group, and heterocyclic group (e.g., 5-carboxybenzoxazole ring, pyridine ring, sulfolane ring, pyrrole ring, pyrrolidine ring, morpholine ring, piperazine ring, pyrimidine ring, and furan ring).

The dyes of the formula (FA) preferably employed in the photographic material of the invention are described in Japanese Patent Provisional Publication No. H4-45436. Concrete examples of the compounds of the formula (FA) [(FA1), (FA2) or (FA3)] are as follows:

F-1

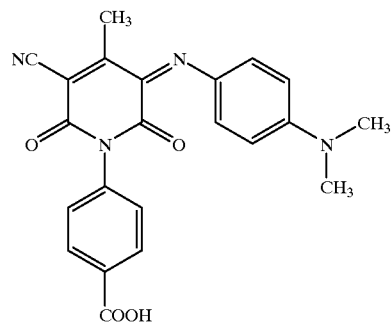

F-2

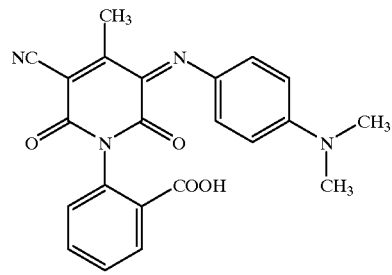

F-3

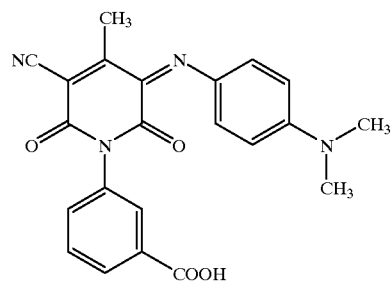

F-4

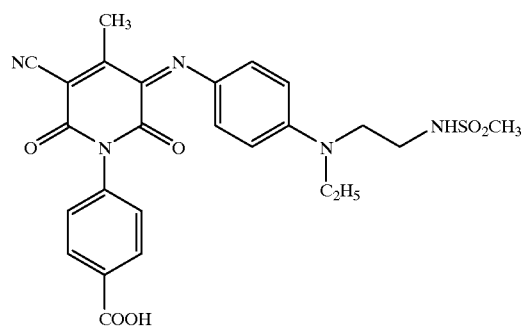

F-5

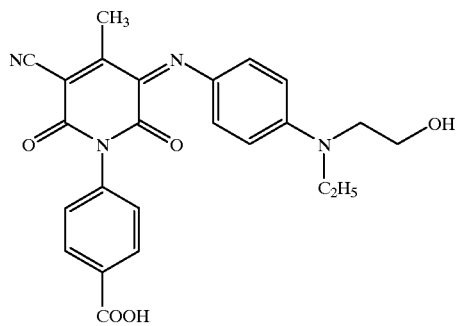
F-6
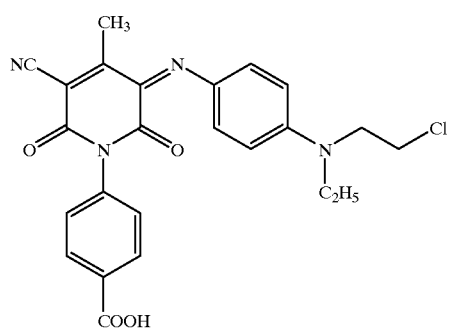
F-7
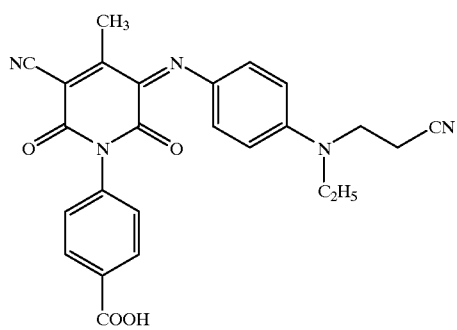
F-8
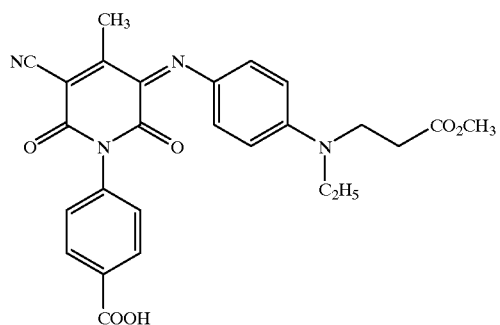
F-9

-continued
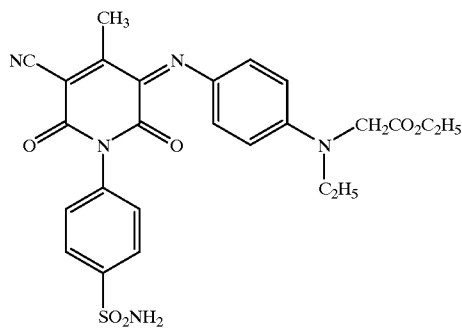
F-10
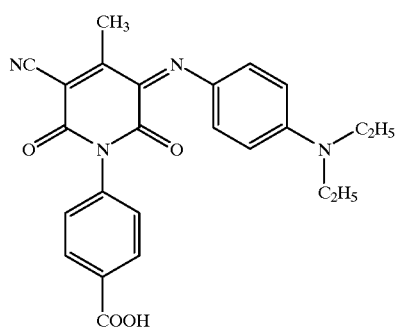
F-11
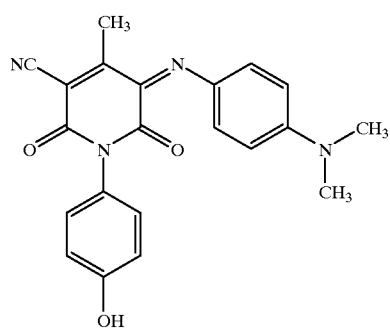
F-12
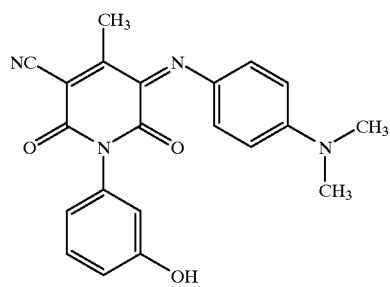
F-13

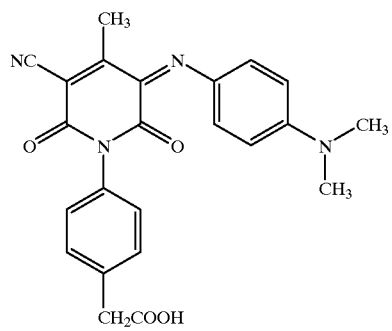
F-14
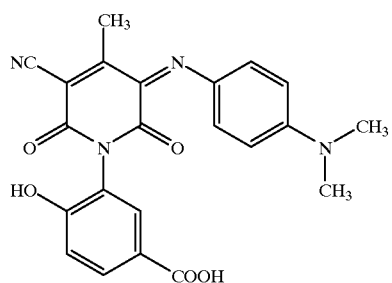
F-15
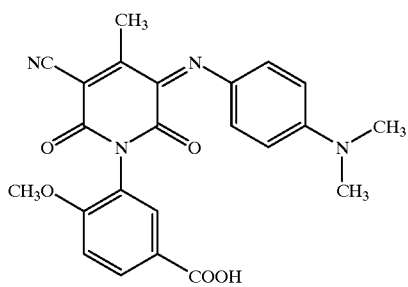
F-16
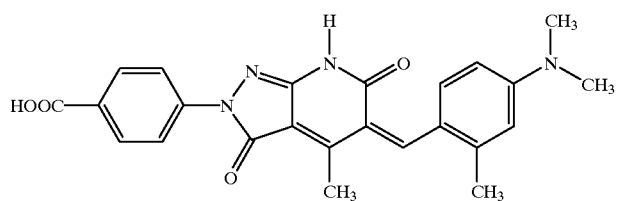
F-17
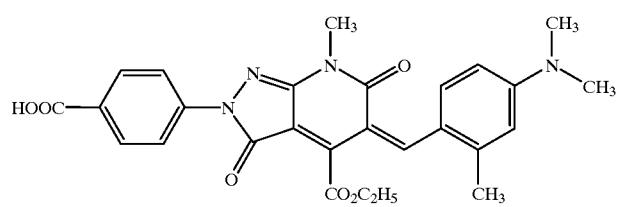
F-18

-continued
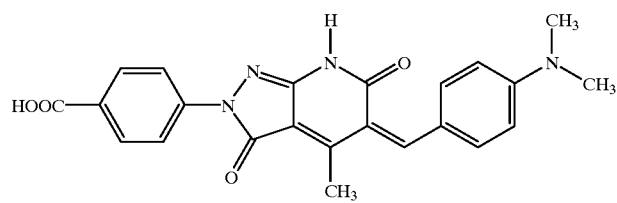
F-19
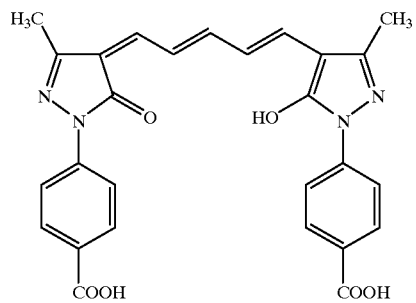
F-20
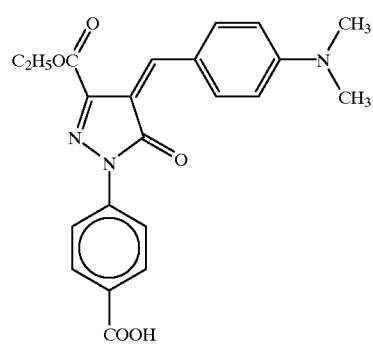
F-21
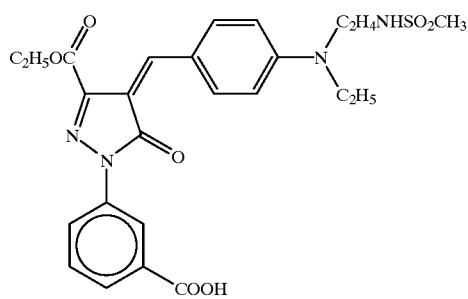
F-22
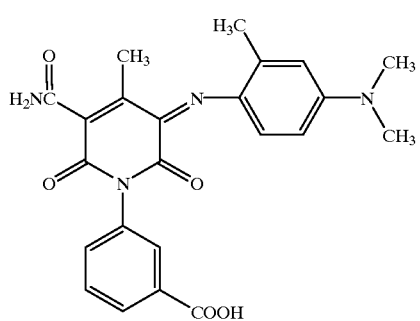
F-23

-continued
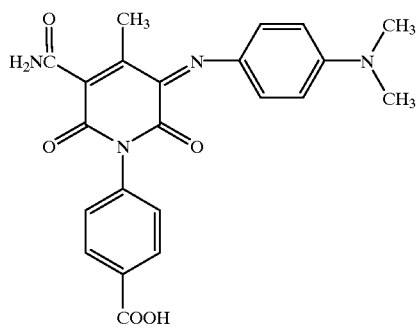
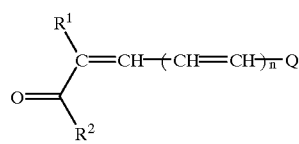
| No. | R¹ | R² | n | Q |
|---|---|---|---|---|
| F-24 | —CN | | 0 | ₂)₂) |
| F-25 | —CN | | 0 | (CH₂COOCH₂CF₃)) |
| F-26 | —CN | | 0 | ₂) |
| F-27 | —CN | | 0 | ₂) |
| F-28 | —CN | | 1 | ₂) |
| F-29 | CH₃C(O)— | | 1 | ₂) |
| F-30 | CH₃C(O)— | ₂) | 1 | (C₂H₅)) |
| F-31 | t-C₄H₉C(O)— | | 1 | ₂) |

-continued
| | | | |
|---|---|---|---|
| F-32 | 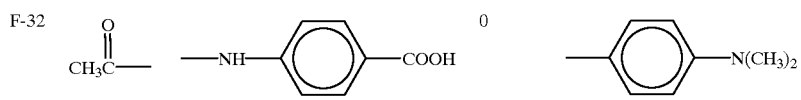 | 0 | |
| F-33 | 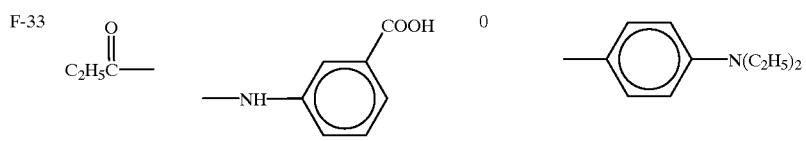 | 0 | |
| F-34 | —CN | 0 | 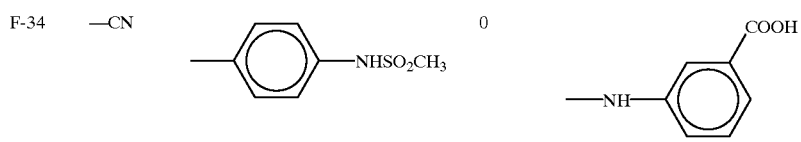 |
F-35
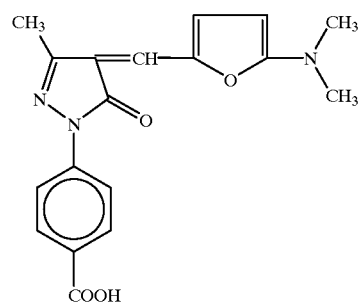
F-36
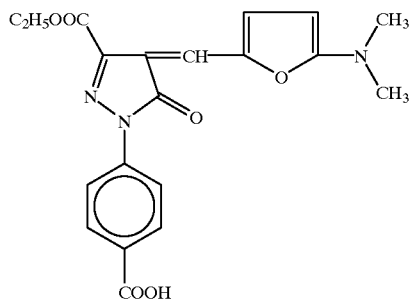
F-37
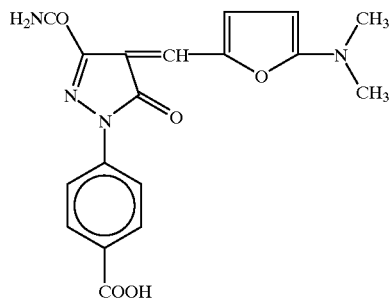
F-38

-continued
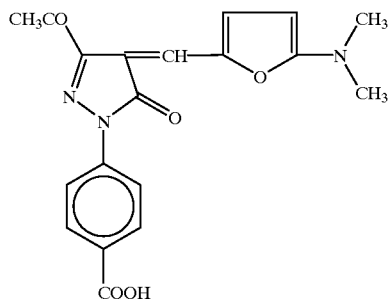
F-39
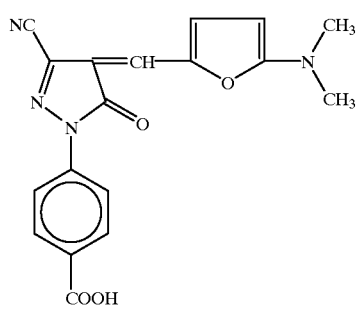
F-40
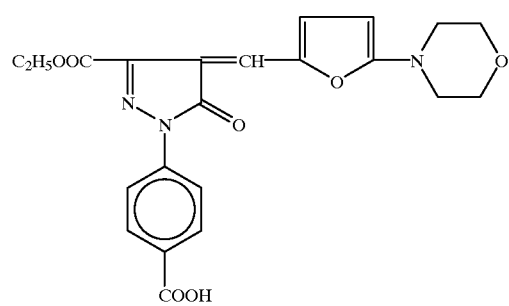
F-41
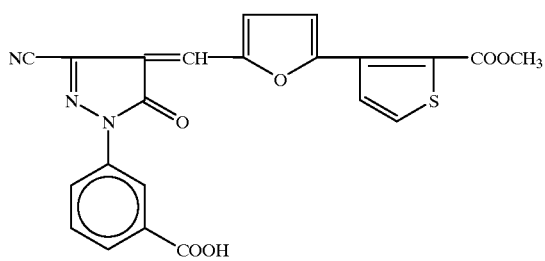
F-42
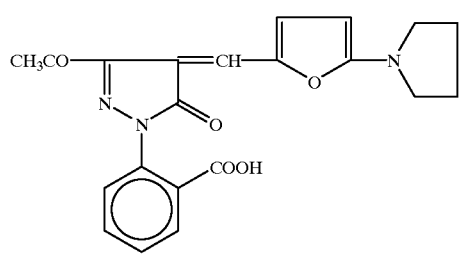
F-43

-continued
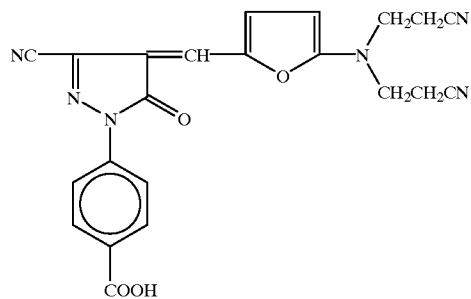
F-44
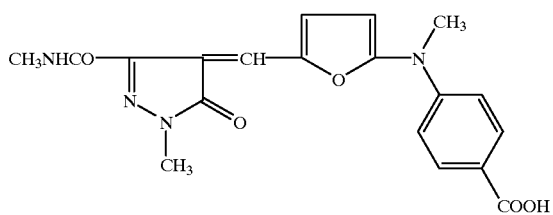
F-45
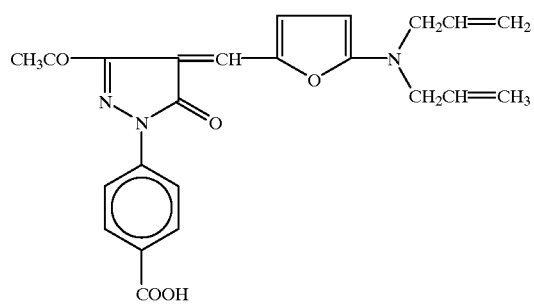
F-46
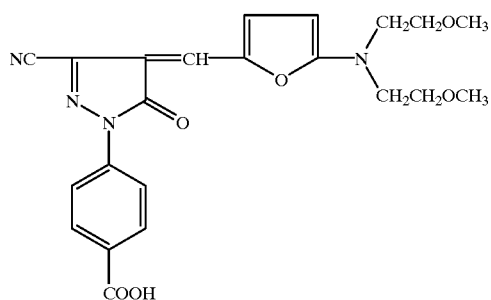
F-47
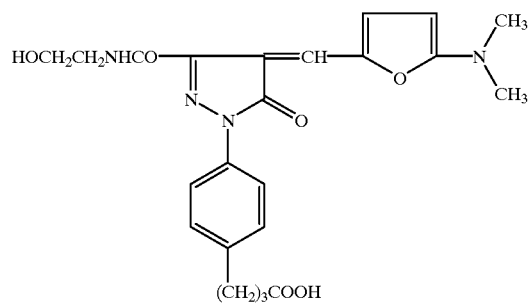
F-48

-continued
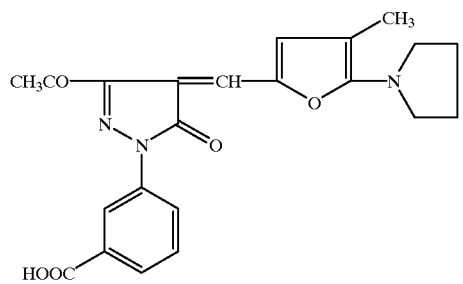
F-49
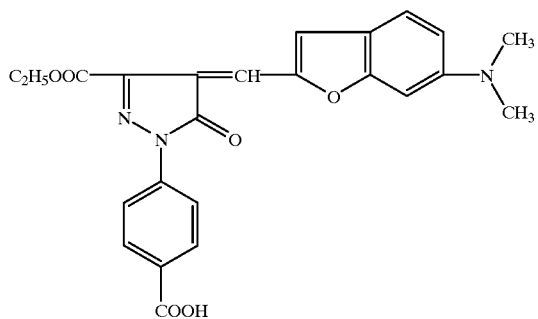
F-50
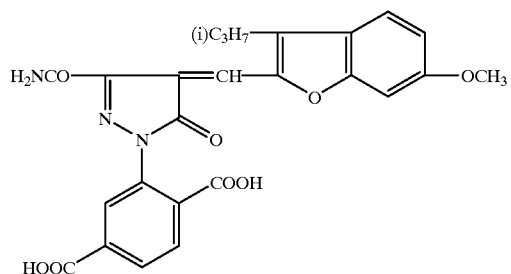
F-51
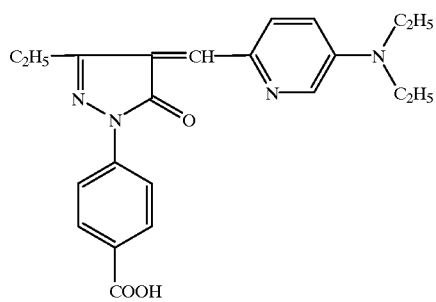
F-52
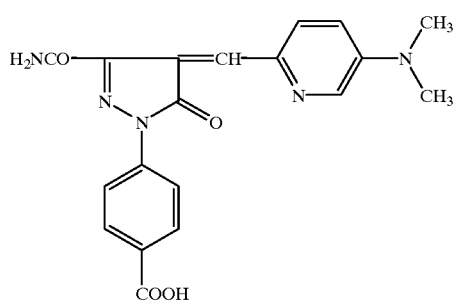

-continued

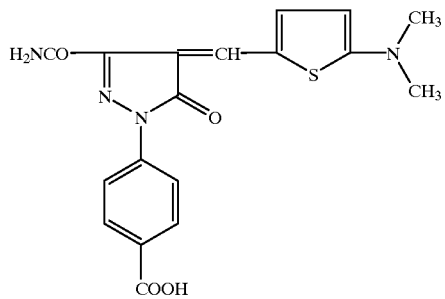

F-53

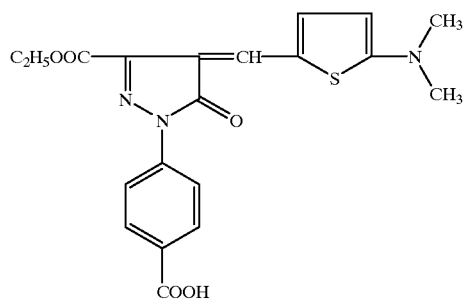

F-54

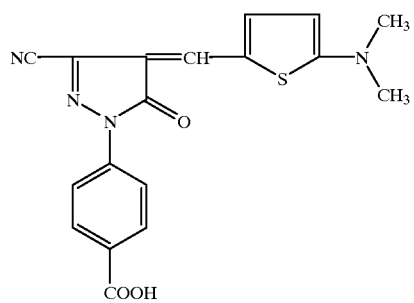

F-55

In Japanese Patent Provisional Publication No. H7-152112, the compounds of the formulas (FA1), (FA2) and (FA3) are described. The compounds of (II-2) to (II-24), (III-5) to (III-18) and (IV-2) to (IV-7) in the publication are those of the formulas (FA1), (FA2) and (FA3), respectively.

As the dye which can be decolorized in the developing process, cyanine dyes, pyrylium dyes and aminium dyes described in Japanese Patent Provisional Publication No. H3-138640 are also employable for the invention in the form of dispersed solid fine particles.

The dyes employable for the invention can be prepared in the manner described in the following publications: WO 88/04794; EP 0274723A1, EP 276566, EP 299435; Japanese Patent Provisional Publications No. 52-92716, No. 55-155350, No. 55-155351, No. 61-205934, No. 48-68623; U.S. Pat. Nos. 2,527,583, 3,486,897, 3,746,539, 3,933,798, 4,130,429, and No. 4,040,841; Japanese Patent Provisional Publications No. H2-282244, No. H3-7931, No. H3-167546, No. H1-266536, No. H3-136038, No. H3-226736, No. H3-138640, and No. H3-211542; Japanese Patent Applications No. H6-227982, No. H6-227983, No. H6-279297, No. H7-54026, No. H7-101968, and No. H7-135118; and Japanese Patent Provisional Publications No. H2-282244, No. H7-113072 and No. H7-53946.

In the invention, the dye which can be decolorized in the developing process is preferably used in the form of solid fine particles. The dye can be mechanically pulverized and dispersed by conventional means (e.g., ball mill, shaking ball mill, floating ball mill, sand mill, colloid mill, jet mill, roller mill) in the presence of a dispersing aid.

As the dispersing aid, the known polymer compounds are employable, and if desired, two or more of polymer compouns may be used in combination. Further, other compounds such as anionic, nonionic or cationic surface active agents and polymers may be used in combination, but preferably the polymer compounds are used alone. The dispersing aid is generally mixed with a powder or wet-cake of the dye to prepare a slurry before the dispersing process, and then the slurry is introduced into the dispersing means. The dispersing aid may be beforehand mixed with the dye, and then the mixture is treated with heat or a solvent to prepare a powder or wet-cake. Further, the dispersing aid may be added into the dispersion liquid while the dye is being pulverized in the dispersing means. In order to stabilize the dispersion liquid, the dispersing aid may be added after the dispersing process. In any case, a solvent (e.g., water, alcohols) is generally used together with the dispersing aid. The pH value may be controlled using a proper pH adjusting agent before, during or after the dispersing process.

The dye may be pulverized and dispersed by the steps of controlling the pH value to dissolve the dye in a solvent, and then varying the pH in the presence of a dispersing aid to deposit thereon fine particles of the dye. As the solvent, an organic solvent is employable. After the above steps, the organic solvent is usually removed.

After the dispersing process, the prepared dispersion can be stored under stirring or under a highly viscous condition in the presence of a hydrophilic colloid (for example, in the form of jelly with gelatin) so that the fine particles may not precipitate. Preferably, antiseptics are added so as to prevent microbes from increasing during storage.

The mean particle size of the dye generally is in the range of 0.005 to 10 $\mu$m, preferably 0.01 to 3 $\mu$m, more preferably 0.05 to 0.5 $\mu$m.

The dye may be incorporated into any part of the photographic material, but it is preferred to incorporate the dye into an layer which is provided on the support. For instance, the dye can be incorporated into an undercoating hydrophilic colloid layer and/or a photo-insensitive hydrophilic colloid layer. Those layers are provided between the support and the silver halide photosensitive emulsion layer. If the photosensitive emulsion layer comprises two or more photosensitive emulsion layers, the dye can be incorporated into a lower photosensitive emulsion layer, that is an emulsion layer near to the support surface.

Generally, two or more undercoating hydrophilic colloid layers are formed on the support in the following manner.

On the support, a hydrophilic colloid liquid is coated and then dried to form a bottom undercoating hydrophilic colloid layer. After that, on the formed layer, the liquid is again coated and then dried to form a next layer. Those procedures are repeated to form plural undercoating hydrophilic colloid layers. On thus formed undercoating hydrophilic colloid layers, a photo-insensitive hydrophilic colloid layer and a photosensitive silver halide emulsion layer are formed at the same time by a simultaneous superposing coating method. Therefore, before the photo-insensitive layer is dried, the emulsion layer is provided thereon.

The undercoating layer and the photo-insensitive layer (provided between the undercoating layers and the emulsion layer) may contain the same dye or different dyes. Further, plural dyes may be incorporated into one layer. In that case, the pulverizing and dispersing method, the mean particle size and the particle shape may be also the same or different from each other.

The amount of the dye depends on the target absorbance and absorption coefficient of the dispersion, but is usually in the range of 0.005 to 2 g/m$^2$, preferably 0.03 to 2 g/m$^2$, more preferably 0.04 to 0.15 g/m$^2$, most preferably 0.05 to 0.12 g/m$^2$ (per 1 m$^2$ of the support, total amount for both faces). The dye may be incorporated into the layer(s) provided on only one side (either the front side or the back side) of the support.

There are no specific restrictions on materials for the hydrophilic colloid, but usually gelatin is preferably used.

The undercoating hydrophilic colloid layer containing the dye preferably contains gelatin in an amount of 0.05 to 0.3 g, more preferably 0.05 to 0.2 g per 1 m$^2$ of one surface of the support.

The photo-insensitive hydrophilic colloid layer containing the dye preferably contains gelatin in an amount of 0.05 to 0.5 g, more preferably 0.1 to 0.4 g per 1 m$^2$ of one surface of the support.

The total amount of the hydrophilic colloid contained in the layers (i.e., undercoating layer containing the dye, photo-insensitive layer containing the dye, emulsion layer and surface protective layer) preferably is in the range of 1.4 to 2.6 g per 1 m$^2$ of one surface of the support.

At least one of the undercoating layer and the photo-insensitive layer described above preferably contains a gelatin-reactive polymer latex. The term of "gelatin-reactive polymer latex" here means a polymer whose surface has a group chemically reactive with a terminal group of gelatin. In the invention, the polymer latex having an active methylene group is preferably employed, and is represented by the following formula (II):

                          (II).

In the formula (II), C$^1$ represents a repeating unit derived from an ethylenic unsaturated monomer having an active methylene group, A$^1$ represents a different repeating unit derived from an ethylenic unsaturated monomer whose homopolymer has a glass transition point of not higher than 35° C., B$^1$ represents a different repeating unit derived from an ethylenic unsaturated monomer, and the repeating units of C$^1$, A$^1$ and B$^1$ are different each other. Each of x, y and z represents a weight percent ratio of the repeating unit C$^1$, A$^1$ or B$^1$, respectively. The values of x, y and z are in the ranges of 0.5 to 40, 60 to 99.5, and 0 to 50, respectively, under the condition of x+y+z=100.

The ethylenic unsaturated monomer giving the repeating unit C$^1$ can be represented by the following formula:

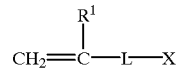

In the formula, R$^1$ represents a hydrogen atom, an alkyl group having 1–4 carbon atoms (e.g., methyl, ethyl, n-propyl, and n-butyl) or a halogen atom (e.g., chlorine and bromine). Preferably, R$^1$ is a hydrogen atom, methyl group, or chlorine atom. Further, X represents a monovalent group having an active methylene group (described later in detail). L is a single bond or a divalent connecting group having the following formula:

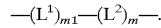

In the formula, L$^1$ represents —CON(R$^2$)— (in which R$^2$ is a hydrogen atom, an alkyl group having 1–4 carbon atoms, or a substituted alkyl group having 1–6 carbon atoms), —COO—, —NHCO—, —OCO—, or a group represented by one of the following formulas:

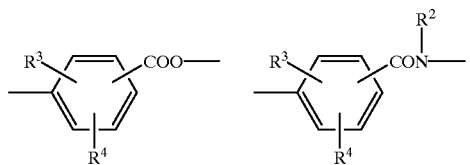

In the formulas, each of R$^3$ and R$^4$ independently represents a hydrogen atom, a hydroxyl group, a halogen atom, a substituted or unsubstituted alkyl, an alkoxy, acyloxy or aryloxy group; and R$^2$ represents the same as described above. L$^2$ is a group connecting L$^1$ and X, and is represented by the following formula:

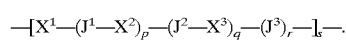

In the formula, $J^1$, $J^2$ and $J^3$ may be the same or different from each other, and each of them independently represents —CO—, —SO$_2$—, —CON(R$^5$)— (in which R$^5$ is a hydrogen atom, an alkyl group having 1–6 carbon atoms or a substituted alkyl group having 1–6 carbon atoms), —O$_2$N (R$^5$)— (in which R$^5$ represents the same as described above), —N(R$^5$)—R$^6$— (in which R$^5$ represents the same as described above, and R$^6$ is an alkylene group having 1–4 carbon atoms), —N(R$^5$)—R$^6$—N(R$^7$)— (in which each of R$^5$ and R$^6$ represents the same as described above, and R$^7$ is a hydrogen atom, an alkyl group having 1–6 carbon atoms or a substituted alkyl group having 1–6 carbon atoms), —O—, —S—, —N(R$^5$)—CO—N(R$^7$)— (in which each of R$^5$ and R$^7$ represents the same as described above), —N(R$^5$)—SO$_2$—N(R$^7$)— (in which each of R$^5$ and R$^7$ represents the same as described above), —COO—, —OCO—, —N(R$^5$)—CO$_2$— (in which R$^5$ represents the same as described above), and —N(R$^5$)CO— (in which R$^5$ represents the same as described above). Each of "p", "q", "r" and "s" represents 0 or 1. $X^1$, $X^2$ and $X^3$ may be the same or different from each other, and each of them independently represents a substituted or unsubstituted alkylene group having 1–10 carbon atoms, an aralkylene group or a phenylene group. The alkylene group may be a straight chain or branched chain. Examples of the alkylene groups include methylene, methylmethylene, dimethylmethylene, dimethylene, trimethylene, tetramethylene, pentamethylene, hexamethylene, and decylmethylene. Examples of the aralkylene groups include benzylidene, and examples of the phenylene groups include p-phenylene group, m-phenylene group and methylphenylene group.

Preferred examples of the monovalent groups of X include R$^8$—CO—CH$_2$—COO—, NC—CH$_2$—COO—, R$^8$—CO—CH$_2$—CO—, and R$^8$—CO—CH$_2$—CON (R$^5$)—. In these formulas, R$^5$ represents the same as described above, and R$^8$ represents a substituted or unsubstituted alkyl group having 1–12 carbon atoms (e.g., methyl, ethyl, n-propyl, n-butyl, t-butyl, n-nonyl, 2-methoxyethyl, 4-phenoxybutyl, benzyl, and 2-methanesulfonamidoethyl), a substituted or unsubstituted aryl group (e.g., phenyl, p-methylphenyl, p-methoxyphenyl, and o-chlorophenyl), alkoxy group (e.g., methoxy, ethoxy, methoxyethoxy, and n-butoxy), a cycloalkyloxy group (e.g., cyclohexyloxy), an aryloxy group (e.g., phenoxy, p-methylphenoxy, o-chlorophenoxy, p-cyanophenoxy), an amino acid, and a substituted amino group (e.g., methylamino, ethylamino, dimethylamino, and butylamino).

Examples of the ethylenic unsaturated monomer giving C$^1$ are given below, but the following examples by no means restrict the invention.

M-1 2-acetoacetoxyethyl methacrylate
M-2 2-acetoacetoxyethyl acrylate
M-3 2-acetoacetoxypropyl methacrylate
M-4 2-acetoacetoxypropyl acrylate
M-5 2-acetoacetamidoethyl methacrylate
M-6 2-acetoacetamidoethyl acrylate
M-7 2-cyanoacetoxyethyl methacrylate
M-8 2-cyanoacetoxyethyl acrylate
M-9 N-(2-cyanoacetoxyethyl)acrylamide
M-10 2-propionylacetoxyethyl acrylate
M-11 N-(2-propionylacetoxyethyl)methacrylamide
M-12 N-4-(acetoacetoxybenzyl)phenylacrylamide
M-13 ethylacryloyl acetate
M-14 acryloylmethyl acetate
M-15 N-methacryloyloxymethylacetoacetamide
M-16 ethylmethacryloyl acetoacetate
M-17 N-allylcyanoacetamide
M-18 methylacryloyl acetoacetate
M-19 N-(2-methacryloyloxymethyl)cyanaacetamide
M-20 p-(2-acetoacetyl)ethylstyrene
M-21 4-acetoacetyl-1-methacryloylpiperazine
M-22 ethyl-α-acetoacetoxy methacrylate
M-23 N-butyl-N-acryloyloxyethylacetoacetamide
M-24 p-(2-acetoacetoxy)ethylstyrene The ethylenic unsaturated monomer giving the repeating unit A$^1$ is a monomer whose homopolymer has a glass transition temperature of not higher than 35° C. Examples of the monomers include an alkylacrylate (e.g., methyl acrylate, ethyl acrylate, n-butyl acrylate, n-hexyl acrylate, benzyl acrylate, 2-ethylhexyl acrylate, and n-dodecyl acrylate), an alkyl methacrylate (e.g., n-butyl methacrylate, n-hexyl methacrylate, 2-ethylhexyl methacrylate, and n-dodecyl methacrylate), a diene (e.g., butadiene and isoprene), and a vinylester (e.g., vinyl acetate and vinyl propionate). The above homopolymer preferably has a glass transition temperature of not higher than 10° C. Examples of the monomers giving such homopolymer include an alkyl acrylate having an alkyl side chain having not less than 2 carbon atoms (e.g., ethyl acrylate, n-butyl acrylate, and 2-ethylhexyl acrylate), an alkyl methacrylate having an alkyl side chain consisting of not less than 6 carbon atoms (e.g., n-hexyl methacrylate, and 2-ethylhexyl methacrylate), and a diene (e.g., butadiene and isoprene). The values of the glass transition temperature are described in "Polymer Handbook, third edition" (by J. Brandrup and E. H. Immergut, pp. V1/209–#V1/277, John Wiley & Sons, 1989).

The repeating unit B$^1$ is different from that of A$^1$, and is derived from a monomer whose homopolymer has a glass transition temperature of not higher than 35° C. Examples of the monomers include acrylates (e.g., t-butyl acrylate, phenyl acrylate, and 2-naphthyl acrylate), methacrylates (e.g., methyl methacrylate, ethyl methacrylate, 2-hydroxyethyl methacrylate, benzyl methacrylate, 2-hydroxypropyl methacrylate, phenyl methacrylate, cresyl methacrylate, 4-chlorobenzyl methacrylate, and ethyleneglycol dimethacrylate), vinyl esters (e.g., vinyl benzoate and pivaloyloxyethylene), acrylamides (e.g., acrylamide, methylacrylamide, ethylacrylamide, propylacrylamide, butylacrylamide, tert-butylacrylamide, cyclohexylacrylamide, benzylacrylamide, hydroxymethylacrylamide, methoxyethylacrylamide, dimethylaminoethylacrylamide, phenylacrylamide, dimethylacrylamide, diethylacrylamide, β-cyanoethylacrylamide, and diacetoneacrylamide), methacrylamides (e.g., methacrylamide, methylmethacrylamide, ethylmethacrylamide, propylmethacrylamide, butylmethacrylamide, tert-butylmethacrylamide, cyclohexylmethacrylamide, benzylmethacrylamide, hydroxymethylmethacrylamide, methoxyethylmethacrylamide, dimethylaminoethylmethacrylamide, phenylmethacrylamide, dimethylmethacrylamide, diethylmethacrylamide, and β-cyanoethylmethacrylamide), styrenes (e.g., styrene, methylstyrene, dimethylstyrene, trimethylenestyrene, ethylstyrene, isopropylstyrene, chlorostyrene, methoxystyrene, acetoxystyrene, dichlorostyrene, bromochlorostyrene, and methyl vinylbenzoate), divinylbenzene, acrylonitrile, methacrylonitrile, N-vinylpyrrolidone, N-vinyloxazolidone, vinylidene chloride, and phenylvinyl ketone.

In order to improve the stability of the latex, the polymer represented by the aforementioned formula (II) may be copolymerized with a monomer having an anionic functional group (e.g., carboxyl group and sulfonic acid group) described in Japanese Patent Publications No. 60-15935, No. 45-3832 and No. 53-28086, and U.S. Pat. No. 3,700,456. Examples of the monomers include acrylic acid, methacrylic acid, itaconic acid, maleic acid, monoalkyl itaconate (e.g., monomethyl itaconate and monoethyl itaconate), monoalkyl maleate (e.g., monomethyl maleate and monoethyl maleate), citraconic acid, styrenesulfonic acid, vinylbenzylsulfonic acid, vinylsulfonic acid, acryloyloxyalkylsulfonic acid (e.g., acryloyloxymethylsulfonic acid, acryloyloxyethylsulfonic acid, and acryloyloxypropylsulfonic acid), methacryloyloxyalkylsulfonic acid (e.g., methacryloyloxymethylsulfonic acid, methacryloyloxyethylsulfonic acid, and methacryloyloxypropylsulfonic acid), acrylamidoalkylsulfonic acid (e.g., 2-acrylamide-2-methylethanesulfonic acid, 2-acrylamide-2-methylpropanesulfonic acid, and 2-acrylamide-2-methylbutanesulfonic acid), methacrylamidoalkylsulfonic acid (e.g., 2-methacrylamide-2-methylethanesulfonic acid, 2-methacrylamide-2- methylpropanesulfonic acid, and 2-methacrylamide-2-methylbutanesulfonic acid). The above acids may be in the form of salts with alkali metals (e.g., Na, K) or an ammonium ion.

In the formula (II), each of x, y and z represents a weight percent ratio of each repeating unit component $C^1$, $A^1$ or $B^1$, respectively. The values of x, y and z are in the ranges of 0.5 to 40 (preferably 0.5 to 30, more preferably 1 to 20), 60 to 99.5 (preferably 70 to 99.5, more preferably 75 to 99), and 0 to 50 (preferably 0 to 35, more preferably 0 to 25), respectively. The above-described monomer having an anionic functional group can be freely used, independently of the glass transition temperature of its homopolymer, in accordance with the purpose such as stabilizing the latex. The amount of the monomer preferably used is in the range of 0.5 to 20 wt. %, more preferably 1 to 10 wt. % per the total amount of the polymer.

Preferred examples of the polymer latexs represented by the formula (II) are given below. In the following copolymers, the weight percent ratios of the components are shown in the brackets.

II-1 ethyl acrylate/M-1/acrylic acid copolymer (85/10/5)

II-2 n-butyl acrylate/M-1/methacrylic acid copolymer (85/5/10)

II-3 to 7 n-butyl acrylate/M-1/acrylic acid copolymer (x/y/z)
  II-3 x/y/z=95/2/3
  II-4 x/y/z=92/5/3
  II-5 x/y/z=89/8/3
  II-6 x/y/z=81/16/3
  II-7 x/y/z=72/25/3

II-8 n-butyl acrylate/styrene/M-1/methacrylic acid copolymer (65/20/5/10)

II-9 methyl acrylate/M-4/methacrylic acid copolymer (80/15/5)

II-10 n-butyl acrylate/M-5/acrylic acid copolymer (85/10/5)

II-11 n-butyl acrylate/M-7/methacrylic acid copolymer (85/10/5)

II-12 2-ethylhexylacrylate/M-9 copolymer (75/25)

II-13 n-butyl acrylate/M-14/potassium styrenesulfinate copolymer (75/20/5)

II-14 n-hexyl acrylate/methoxyethyl acrylate/M-2 copolymer (70/20/10)

II-15 2-ethylhexyl acrylate/M-15/methacrylic acid copolymer (90/5/5)

II-16 n-butyl acrylate/M-1/M-17/acrylic acid copolymer (75/5/15/5)

The polymer latex is prepared by the well-known emulsion polymerization process, and the particle size preferably is the range of 0.01 to 0.1 μm. The emulsion polymerization process is preferably performed in the following manner. In water or a mixed solvent consisting of water and an organic solvent (e.g., methanol, ethanol, acetone) compatible with water, the monomer is emulsified and then polymerized by a radical polymerization initiator at a temperature of 30° C. to approx. 100° C., preferably 40° C. to approx. 90° C. The amount of the water-compatible organic solvent generally is in the range of 0 to 100 volume %, preferably 0 to 50 volume % per that of water. In the process, a radical polymerization initiator is used in an amount of 0.05 to 5 wt. % per that of the monomer, and if desired an emulsifier is used in an amount of 0.1 to 10 wt. % per that of the monomer. As the radical polymerization initiator, azobis compounds, peroxides, hydroperoxides, and redox solvents are employable. Examples of them include potassium persulfate, ammonium persulfate, tert-butyl peraquate, benzoyl peroxide, isopropyl carbonate, 2,4-dichlorobenzyl peroxide, methylethyl ketone peroxide, cumene hydroperoxide, dicumyl peroxide, 2,2'-azobisisobutylate, and 2,2'-azobis(2-amidinopropane)hydrochloride. As the emulsifier, water-soluble polymers as well as anionic, cationic, amphoteric and nonionic surface active agents are employed. Examples of them include sodium laurate, sodium dodecylsulfate, sodium 1-octoxycarbonylmethyl-1-octoxycarbonylmethanesulfonate, sodium laurylnaphthalenesulfonate, sodium laurylbenzenesulfonate, sodium laurylphosphate, cetyltrimethylammonium chloride, dodecyltrimethyleneammonium chloride, N-2-ethylhexylpyridinium chloride, polyoxyethylenenoneylphenyl ether, polyoxyethylenesorbitanlauric ester, polyvinyl alcohol, and the emulsifier and water-soluble polymers disclosed in Japanese Patent Publication No. 53-6190.

Needless to say, the emulsion polymerization conditions such as polymerization initiator, concentration, reaction temperature and reaction time can be optionally selected in consideration of its purpose. In the polymerization process, the components such as monomer, surface active agent and medium may be beforehand placed in a reaction container and then the initiator may be added to polymerize the monomer, or otherwise all or a portion of each component may be dropwise added to perform the polymerization.

The monomer giving the repeating unit $C^1$ in the formula (II) and the polymer latex having an active methylene group can be prepared in the manners described in U.S. Pat. Nos. 3,459,790, 3,619,195, 3,929,482, and 3,700,456; West Germany Patent No. 2,442,165; EP 13,147; and Japanese Patent Provisional Publications No. 50-73625 and No. 50-146331. Preferably, the polymer latex having an active methylene group has the core/shell structure.

In the photographic material, the ratio of the polymer latex content in the emulsion layer to that in the photo-insensitive hydrophilic colloid layer (content per gelatin in the emulsion layer/that in the photo-insensitive layer) preferably is not less than 1.0, more preferably in the range of 0 to 0.9.

In the case that the photographic material has two or more emulsion layers provided on one side, the above polymer latex content per gelatin is calculated based on the total amounts of gelatin and the polymer latex in the layers. If the photographic material has two or more photo-insensitive layers provided on one side, at least one of them satisfies the above condition for the polymer latex content. The amount of the polymer latex used for the invention is not particularly restricted as long as the above condition is satisfied, but preferably in the range of 10 mg/m$^2$ to 10 g/m$^2$, more preferably 100 mg/m$^2$ to 1.5 g/m$^2$. In each layer, the polymer latex content per gelatin generally is in the range of 5 to 400 wt. %, preferably 10 to 200 wt. %.

In the invention, the photosensitive emulsion layer preferably contains tabular silver halide particles having an aspect ratio of 2 to 30, in an amount of 50 to 100%, more preferably 80 to 100% per the total silver halide particles in terms of the projected area. The average aspect ratio of the tabular silver halide particles preferably is in the range of 3 to 20. The "average aspect ratio" here means a value calculated by dividing a mean diameter of a circle corresponding to a projected area by a mean thickness of particles. Generally. an emulsion containing tabular particles of a large aspect ratio has a low sensitivity for blue light, but has a high sensitivity for green light. Therefore, the tabular particles having a large aspect ratio is preferably used for the invention.

The silver halide composition used for the invention is not particularly restricted, and examples of the silver halide composition include silver chloride, silver bromide, silver iodide, silver bromide chloride, silver bromide iodide and silver bromide chloride iodide. Preferred are silver bromide iodide, silver bromide chloride iodide containing 0 to 0.5 mol % of silver iodide, and silver (bromide) chloride (iodide) containing 50 to 100 mol % of silver chloride, because those silver halides give an emulsion having a low sensitivity for blue light. The preferred tabular silver halide particles can be prepared in the known manner. Particularly preferred are the monodispersed hexagonal tabular particles (described in Japanese Patent Provisional Publication No. 63-151618) and the tabular silver halide particles having an average thickness of not more than 1 μm (described in Japanese Patent Provisional Publications No. 62-115435, No. H6-43605, and No. H6-43606).

As the surface protective layer provided on the emulsion layer, known material can be used for the invention. In the protective layer, hydrophilic colloid such as gelatin is contained as a binder. As the transparent support, known material such as polyethylene terephthalate (PET) can be used.

Preferred examples of the silver halide photographic materials (radiographic films) employed in combination with with the radiographic intensifying screen for the present invention, and preferred examples of the components for the photographic material are as follows:

1) Example 1 in Japanese Patent Provisional Publication No. H6-332088, and Examples 1 and 2 in Japanese Patent Provisional Publication No. H7-219162;

2) Emulsion containing silver chloride having {100} principal plane, described in
   Examples 3 and 4 in Japanese Patent Provisional Publication No. H5-204073,
   Example 2a in Japanese Patent Provisional Publication No. H6-194768, and
   Example 1 in Japanese Patent Provisional Publication No. H6-227431;

3) Photographic material containing silver bromide iodide, silver bromide or silver bromide chloride having {111} principal plane, described in
   Example 1 in Japanese Patent Provisional Publication No. H8-76305, and
   Examples A and K in Japanese Patent Provisional Publication No. H8-69069;

4) Monodispersed cubic particles (in which the variation coefficient of the diameter of the circle corresponding to the projected area is preferably in the range of 3 to 40%), described in
   Example 1 in Japanese Patent Provisional Publication No. H8-76305.

More detailed description of the preferable photographic material and the components thereof is given in Japanese Patent Provisional Publication No. H6-67305.

In the invention, it is also preferred to shift the distribution of spectroscopic sensitivity of the photographic material in order to effectively use the luminescence emitted by the fluorescent dye or pigment. The method for shifting is well-known and, for example, additives such as thiocyanates, monomethine dyes, azaindene compounds, imidazole dyes and silver iodide are used.

The photographic material and the radiographic intensifying screen may be singly combined to use. However, in many cases, the photographic material having silver halide emulsion layers provided on both sides and a pair of the intensifying screens (which are referred to as "front screen" and "back screen") are used in combination.

Examples of the developer preferably used for the development of the photographic material of the invention include polyhydroxybenzenes (such as hydroquinone, which is generally used for the treatment process of conventional medical silver halide photographic materials); and ascorbic acid, erysorbic acid (diastereomer of ascorbic acid), and their alkaline metal salts (e.g., lithium salts, sodium salts, potassium salts). The time for the treatment in dry-to-dry of the photographic material preferably is in the range of 20 to 100 seconds, more preferably 25 to 50 seconds. In the treatment process, each of the developer and the fixer is preferably supplied in an amount of 25 to 200 mL, more preferably 40 to 160 mL, further preferably 60 to 130 mL.

In the process for producing the silver halide photographic material, the coated and dried material is wound up into a roll under an absolute humidity of not more than 1.4 wt. %, preferably 0.6 to 1.3 wt. %. Thus wound roll of the material is further processed under an absolute humidity of not more than 1.4 wt. %, preferably 0.6 to 1.3 wt. %. The "absolute humidity (wt. %)" here means a percent ratio of weight (kg) of water vapor in wet air to that (kg) in dry air, and hence it indicates the degree of wet air.

The photographic material thus produced is preferably stored in a heat-sealed moisture-proof bag in which the absolute humidity is kept in the range of not more than 1.4 wt. %, preferably 0.6 to 1.1 wt. %. Prior to the storage in the bag, it is particularly preferred for the photographic material to season under an absolute humidity of not more than 1.4 wt. % after the above process.

EXAMPLE 1

Production of Radiographic Intensifying Screen A
1) Preparation of Support Having Light-reflecting Layer Containing Titanium Dioxide 500 g of rutile type titanium dioxide powder having a mean grain size of 0.28 μm (CR95 [trade name], available from Ishihara Industries Co., Ltd.) and 100 g of acrylic binder resin (Cryscoat P1018GS [trade name], available from Dainippon Ink & Chemicals, Inc.) were placed in methyl ethyl ketone, and mixed to prepare a coating liquid having a viscosity of 10 PS. The coating liquid was then evenly applied by means of a doctor blade onto a polyethylene terephthalate film (thickness: 250 μm) containing titanium dioxide powder, and then dried to form a light-reflecting layer. The thickness of the dried light-reflecting layer was 40 μm. The volume filling content of titanium dioxide in the light-reflecting layer was 48%, and a diffuse reflectivity at a wavelength of 545 nm (which corresponds to the main peak of the luminescence emitted by terbium activated gadolinium oxysulfide $Gd_2O_2S$:Tb phosphor) was 95.5%.

2) Preparation of a Phosphor Sheet 250 g of terbium activated gadolinium oxysulfide ($Gd_2O_2S$:Tb, mean grain size: 3.5 μm, amount of Tb per 1 mol of Gd: 0.003[0.3 mol %]), 8 g of polyurethane binder resin (Pandex T5265M [trade name], available from Dainippon Ink & Chemicals, Inc.), 2 g of epoxy binder resin (Epicoat 1001 [trade name], available from Yuka Shell Epoxy Kabushiki Kaisha), 10 mg of the fluorescent dye No. 25 (coumarin-6, compound No. 44,263-1, available from Aldrich) and 0.5 g of isocyanate compound (Colonate HX [trade name], available from Nippon Polyurethane Kogyo Kabushiki Kaisha) were placed in methyl ethyl ketone, and mixed by means of a propeller mixer to prepare a coating liquid having a viscosity of 25 PS (at 25° C.). The coating liquid was then applied onto a temporary support (polyethylene terephthalate sheet having a surface beforehand coated with silicon releasing agent), and dried to form a phosphor layer. The formed phosphor layer was then peeled off from the temporary support to prepare a phosphor sheet.

3) Fixing Phosphor Sheet onto Light-reflecting Layer

The above-prepared phosphor sheet was placed on the light-reflecting layer prepared in the above 1), and then pressed to fix by means of a calender roll under a pressure of 400 kgw/cm$^2$ at 80° C. The thickness of the resultant phosphor layer was 100 μm, and the volume filling content of the phosphor was 68%.

4) Preparation of Surface Protective Layer

A polyethylene terephthalate (PET) film (thickness: 6 μm) containing anatase type titanium dioxide (A220 [trade name], available from Ishihara Industries Co., Ltd.) in an amount of 3 wt. % was prepared. The scattering length and the haze of the film observed at 545 nm were 30 μm and 50, respectively. The film was laminated on the phosphor layer using a polyester adhesion. Thus, a radiographic intensifying screen (Screen A) comprising a support, a light-reflecting layer, a phosphor layer and a surface protective layer was produced.

Production of Radiographic Intensifying Screens B, C and D for Invention

The above-mentioned procedures were repeated except for using each of the fluorescent dyes shown in Table 2 in the shown amount in place of 10 mg of the fluorescent dye No. 25, to prepare each of the radiographic intensifying screens (Screens B, C and D) for the invention.

Production of Radiographic Intensifying Screens X, Y and Z for Comparison

The procedures for the preparation of Screen A were repeated except for using a non-fluorescent yellow dye (oil yellow 3G [trade name], available from Orient Industries Co., Ltd.) in each amount shown in Table 2 in place of 10 mg of the fluorescent dye No. 25, to prepare each of radiographic intensifying screens (Screens X and Y) for comparison. Further, the procedures for the preparation of Screen A were repeated except for using no fluorescent dye to prepare a radiographic intensifying screen (Screen Z) for comparison.

Measurement of Emission Spectrum

Each screen produced above was excited with X-rays (40 KVp, tungsten target tube), and an emission spectrum was measured by means of a modified fluorophotometer (F4010, manufactured by HITACHI, Ltd.). The results are shown in FIGS. 1 to 3.

Figure 1:
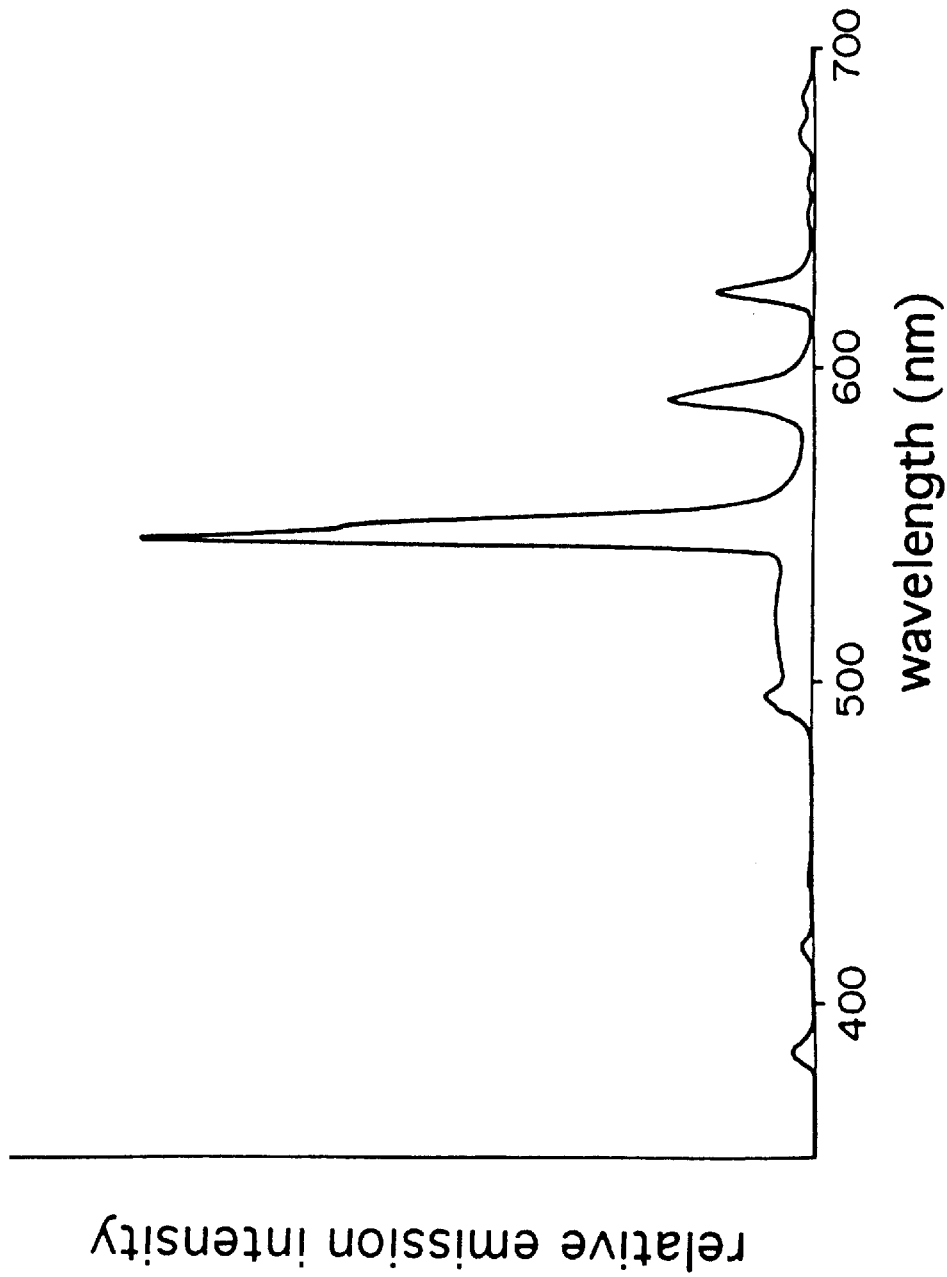
FIG. 1 shows an emission spectrum of a radiographic intensifying screen which contains a fluorescent dye according to the invention.

FIG. 1 shows an emission spectrum of Screen B containing the fluorescent dye according to the invention.

FIG. 2 shows an emission spectrum of Screen Z containing no fluorescent dye.

Figure 3:
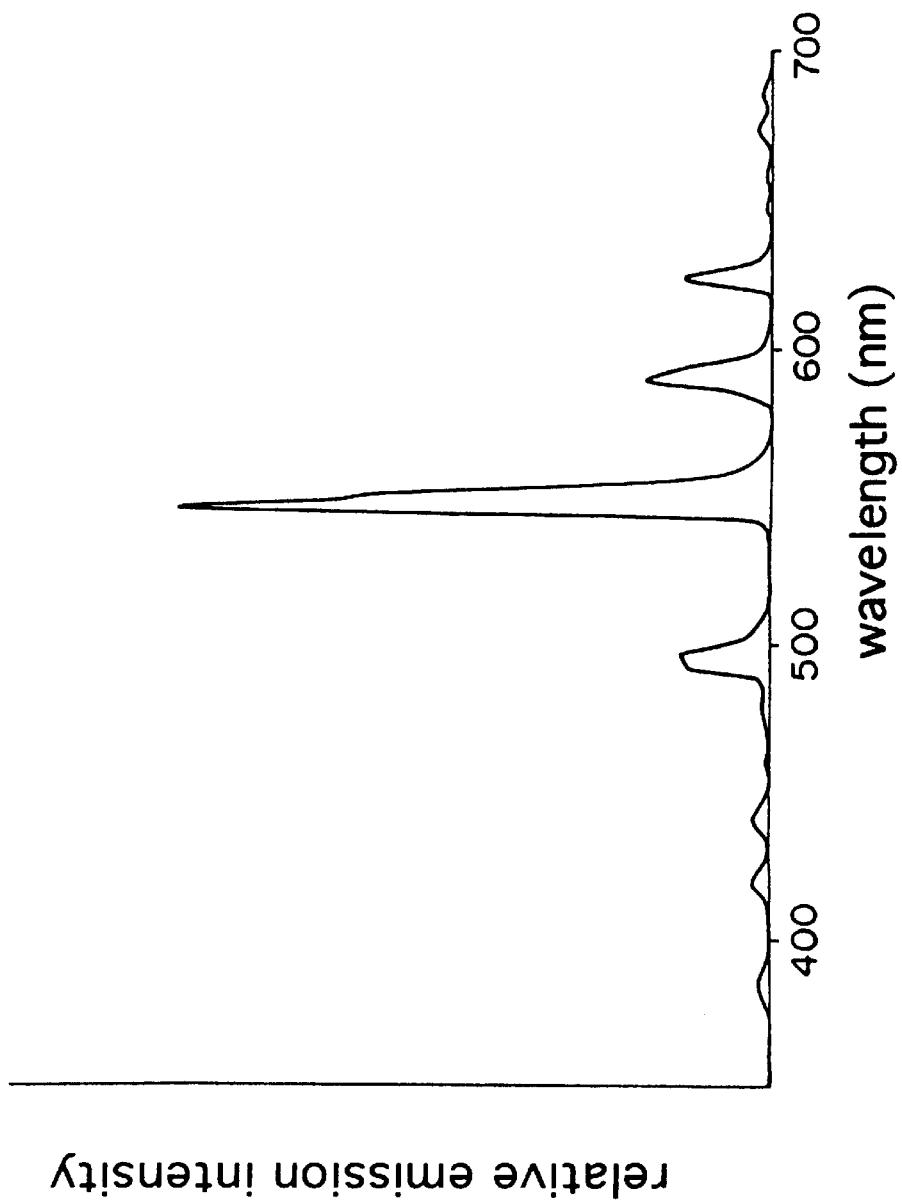
FIG. 3 shows an emission spectrum of a radiographic intensifying screen for comparison which contains a yellow absorbing dye.

FIG. 3 shows an emission spectrum of Screen X containing a yellow absorbing dye for comparison.

Comparison between FIG. 1 and FIG. 2 confirms the following fact. Since the fluorescent dye absorbs bright emission lines of $Gd_2O_2S$:Tb phosphor in the wavelength region shorter than 500 nm, the screen B of the invention exhibits a broad emission spectrum having the maximum peak at 520 nm. This means that the light emitted by Screen B of the invention has a relatively small amount of blue component (light in the wavelength region of 380 to 500 nm) and a relatively large amount of green component (light in the wavelength region of 500 to 570 nm).

FIG. 3 indicates the following fact. Although the yellow dye contained in Screen X absorbs the blue component of the emitted light to reduce the cross-over, the sensitivity contributed by the blue component is reduced.

Figure 4:
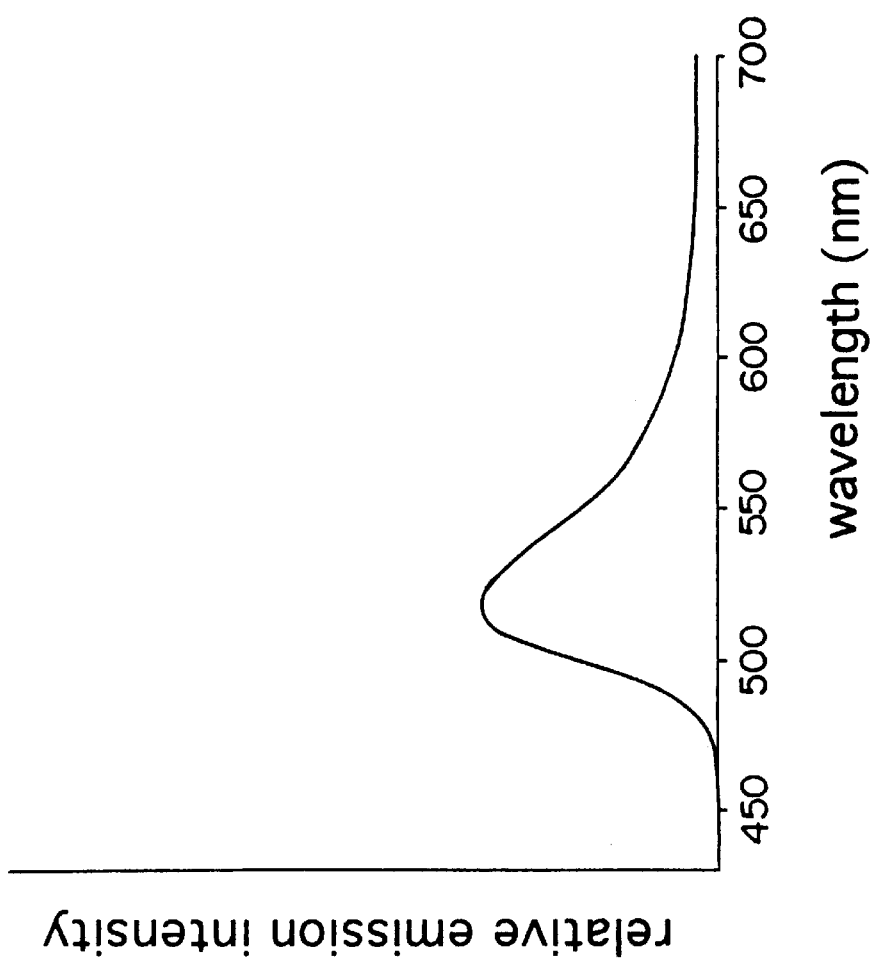
FIG. 4 shows an emission spectrum of the radiographic intensifying screen of FIG. 1 which is observed under excitation of a light at 417 nm.

FIG. 4 shows an emission spectrum of Screen B excited at 417 nm. As shown in FIG. 4, the fluorescent dye No. 25 emits a luminescence having a maximum peak at approx. 520 nm and the half-width of 58 nm.

Figure 5:
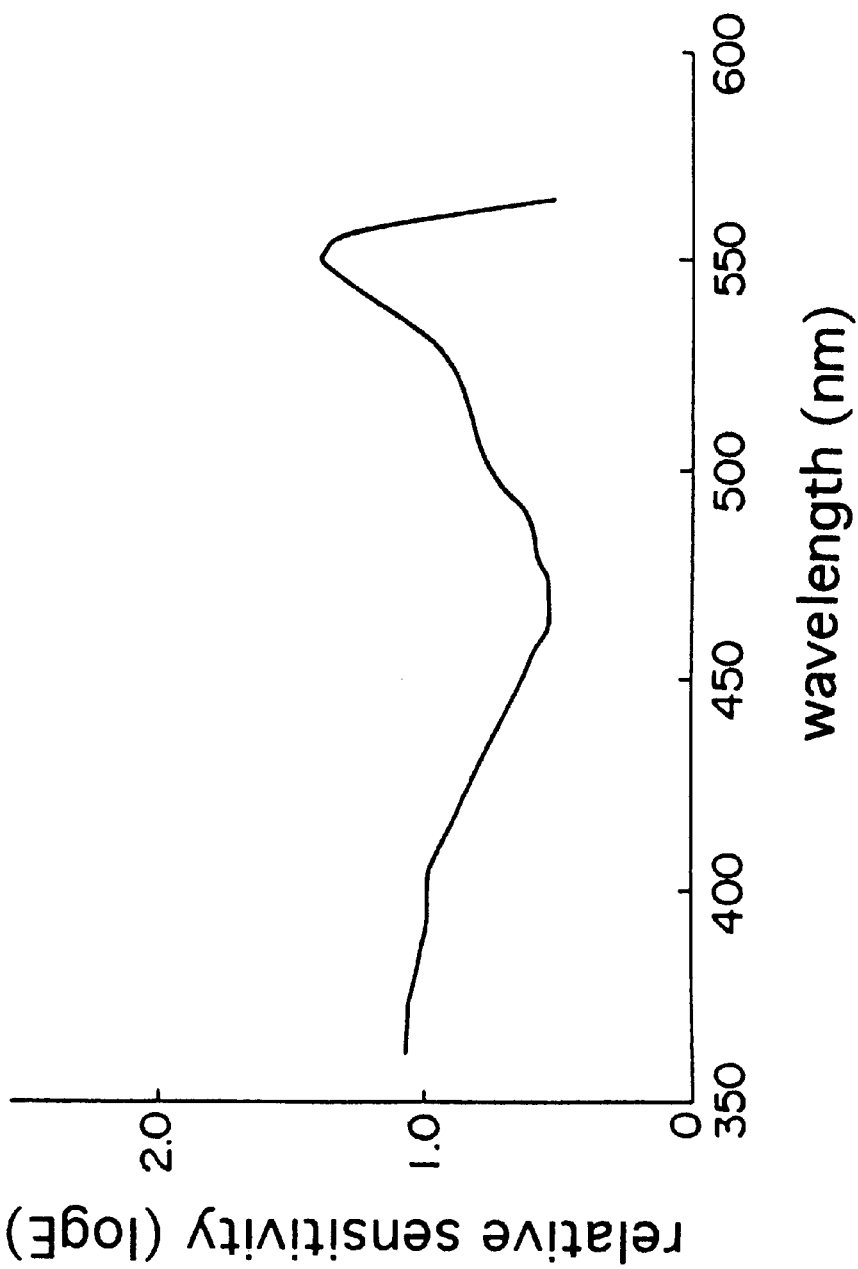
FIG. 5 shows a spectrum indicating a spectral sensitivity of a photographic material according to the invention.

FIG. 5 shows a spectrum indicating spectral sensitivity of the photographic material (sample 1) described below, and indicates that the sample is more sensitive to the green component than the blue component. According to FIG. 5, the luminescence emitted by the fluorescent dye preferably has a maximum peak in the range of 490 to 600 nm. Since a relatively small amount of the blue component is absorbed by the photographic material, the cross-over can be effectively reduced using a combination of the above photographic material and the intensifying screens emitting a relatively small amount of the blue component.

Production of Silver Halide Photographic Material (Sample 1)

Silver halide photographic material (Sample 1) was produced in the following manner.

(Preparation of Emulsion A: {111} tabular particles of AgBr)

6.0 g of KBr and 7.0 g of gelatin (weight average molecular weight: 15,000) were placed in 1 litter of water, and then heated to 55° C. To the prepared dispersion liquid at that temperature, 38 ml of a mixture of 37 mL of aqueous $AgNO_3$ solution ($AgNO_3$: 4.00 g) and 5.9 g of Kr was added with stirring for 37 seconds by a double-jet method. After that, 18.6 g of gelatin was further added. The resultant dispersion liquid was heated to 70° C., and then 89 mL of aqueous $AgNO_3$ solution ($AgNO_3$: 9.80 g) was added for 22 minutes. 7 mL of 25% aqueous ammonia solution was further added, and then the liquid was stored for 10 minutes for physical ripening while the temperature was kept at the same level. After the physical ripening, 6.5 mL of 100% aqueous acetic acid solution was added. Further, 435 mL of aqueous $AgNO_3$ solution ($AgNO_3$: 153 g) and 677 mL of aqueous KBr solution (KBr: 573 g) were added for 37 minutes by a double-jet method while the value of pAg was kept at 8.5. After that, 15 mL of 2 N aqueous potassium thiocyanate solution was added. Thus obtained liquid was then stored for 5 minutes for physical ripening while the temperature was kept at the same level. The resultant liquid was cooled to 35° C.

The AgBr particles formed in thus prepared liquid had the following characteristic values on the shape.

a1: [total projected area of {111} tabular particles having an aspect ratio of 2–30/that of all particles]×100=95%, a2: [average aspect ratio (mean diameter/mean thickness) of {111} tabular particles having an aspect ratio of 2–30]=12.0, a3: [mean diameter of the circle corresponding to the projected area of {111} tabular particles having an aspect ratio of 2–30]=1.20 μm, a4: [mean thickness of {111} tabular particles having an aspect ratio of 2–30]=0.10 μm, and variation coefficient of diameters of the circles corresponding to the projected area=15.5% (which confirms that the sizes of the prepared {111} tabular particles were monodispersed).

After the above procedures, soluble salts were removed by a sedimentation method. The liquid was again heated at 40° C., and then 30 g of deionized gelatin treated with alkali, 2.35 g of phenoxyethanol and 0.8 g of sodium polystyrenesulfonate (thickener) were added. After that, the values of pH and pAg were adjusted to 5.90 and 8.00 with sodium hydroxide and silver nitrate, respectively.

(Chemical Sensitization)

The above-prepared particles were subjected to chemical sensitization with stirring at 56° C. in the following manner. To the above liquid, Thiosulfonate compound-1 (shown below) was added in the amount of $1 \times 10^{-4}$ mol per 1 mol of the silver halide, and then AgI fine particles having a mean diameter of 0.10 μm was further added in an amount of 0.1 mol % based on the total amount of silver. After 5 minutes, 1 wt. % KI solution was added in an amount of $1 \times 10^{-3}$ mol per 1 mol of the silver halide, and then the liquid was stored for 3 minutes. Then, $1 \times 10^{-6}$ mol/mol Ag of thiourea dioxide was added, and the resulting liquid was further stored for 22 minutes for reduction sensitization. After that, $3 \times 10^{-4}$ mol/mol Ag of 4-hydroxy-methyl-1,3,3a,7-tetraazaindene and Sensitizing dyes-1, 2 and 3 (shown below) were added in each amount shown below. Further, $1 \times 10^{-2}$ mol/mol Ag of calcium chloride, $1 \times 10^{-5}$ mol/mol Ag of chloroaurate and $3.0 \times 10^{-3}$ mol/mol Ag of potassium thiocyanate were added. Following that, $6 \times 10^{-6}$ mol/mol Ag of sodium thiosulfate and $4 \times 10^{-6}$ mol/mol Ag of Selenium compound-1 (shown below) were added. After 3 minutes, 0.5 g/mol Ag of nucleic acid was added. The obtained liquid was stored for 40 minutes, and then Water-soluble mercapto compound-1 (shown below) was added. The resulting liquid was cooled to 35° C. to prepare the aimed emulsion.

Thiosulfonate compound-1

$C_2H_5SO_2SNa$

Sensitizing dye-1

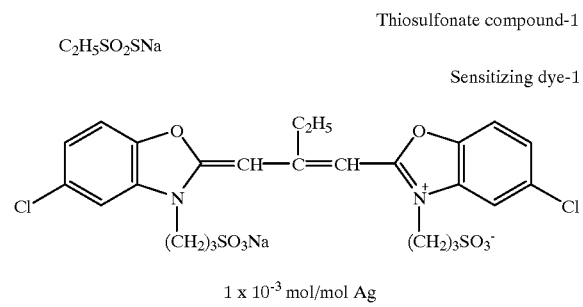

$1 \times 10^{-3}$ mol/mol Ag

Sensitizing dye-2

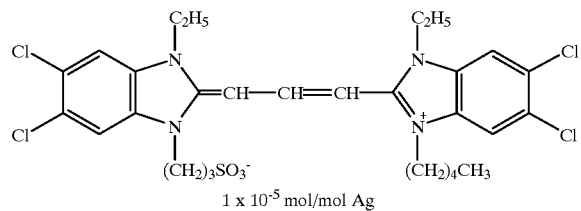

$1 \times 10^{-5}$ mol/mol Ag

Sensitizing dye-3

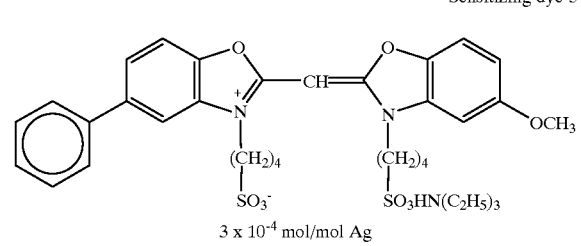

$3 \times 10^{-4}$ mol/mol Ag

Selenium compound-1

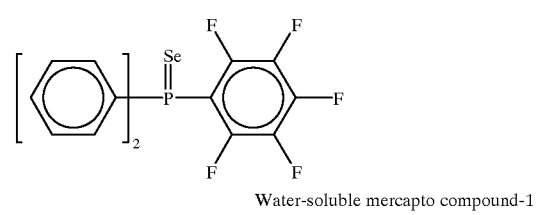

Water-soluble mercapto compound-1

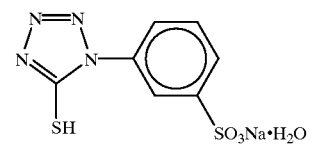

(Preparation of Coating Liquid for Emulsion Layer)

Into the emulsion chemically sensitized in the above manner, the following compounds were added in the amounts described below per 1 mol of the silver halide, to prepare a coating liquid for emulsion layer.

| | |
|---|---|
| Gelatin (including that contained in the emulsion) | 80 g |
| Dextran (average molecular weight: 39,000) | 10.0 g |
| Sodium polyacrylate (average molecular weight: 400,000) | 5.1 g |
| Sodium polystyrenesulfonate (average molecular weight: 600,000) | 1.2 g |
| Potassium iodide | 78 mg |
| Hardening agent: 1,2-bis(vinyl-sulfonylacetoamide) ethane | 4.3 g |
| Compound A-1 | 42.1 mg |
| Compound A-2 | 10.3 g |
| Compound A-3 | 0.11 g |
| Compound A-4 | 8.5 mg |
| Compound A-5 | 0.43 g |
| Compound A-6 | 0.04 g |
| Compound A-7 | 15 g |
| Dye emulsion a (solid content) | 0.50 g |
| Dye emulsion m (solid content) | 30 mg |
| NaOH (with which pH was adjusted at 6.1). | |

Compound A-1

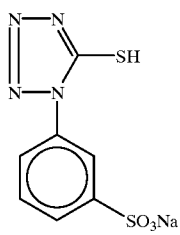

Compound A-2

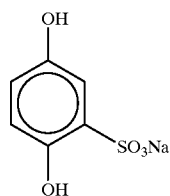

Compound A-3

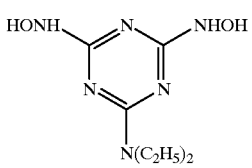

Compound A-4

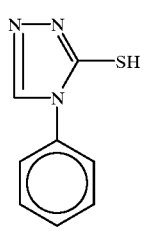

Compound A-5

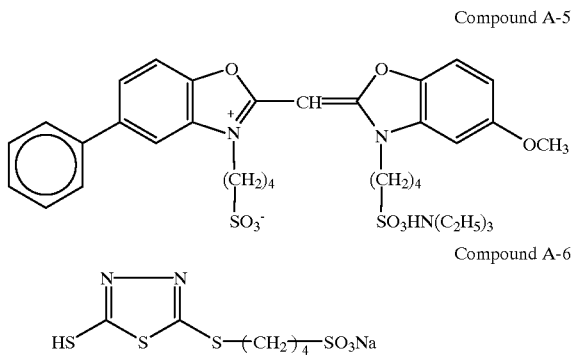

Compound A-6

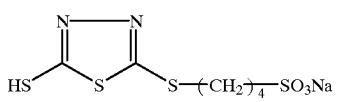

Compound A-7 core/shell latex
core:shell = 50:50 (by weight)
[core] styrene/butadiene copolymer
(37/63, by weight)
[shell] styrene/2-acetoacetoxyethylmethacrylate
(84/16, by weight)
average particle size (approx. 0.1 μm).

Dye emulsions a and m in the above were prepared in the following manner.
(Preparation of Dye Emulsion a)

60 g of Dye-1 (shown below), 62.8 g of 2,4-diamylphenol and 62.8 g of dicyclohexylphthalate were dissolved in 333 g of ethyl acetate at 60° C. Then, 65 mL of 5 wt. % sodium dodecylbenzenesulfonate aqueous solution, 94 g of gelatin and 581 mL of water were added and emulsified at 60° C. for 30 minutes using a dissolver. Further, 2 g of p-methyl hydroxybenzoate and 6 L of water were added, and the thus obtained mixture was cooled to 40° C. The mixture was condensed using a ultrafilter (Labo-Module ACP1050 [trade name], available from Asahi Chemical Industry Co., Ltd.) to reduce the amount to 2 kg. Thereafter, 1 g of p-methyl-hydroxybenzoate was added to prepare Dye emulsion a.

Dye-1

Preparation of Dye Emulsion m

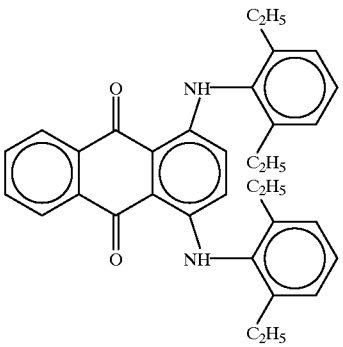

(Preparation of Dye Emulsion m)

10 g of Dye-2 (shown below) was dissolved in a mixed solvent of 10 mL of tricresyl phosphate and 20 mL of ethyl acetate. Thus prepared solution was added to 100 mL of 15 wt. % aqueous gelatin solution containing 750 mg of Anionic surface active agent-1 (shown below), and emulsified to prepare Dye emulsion m.

Dye-2

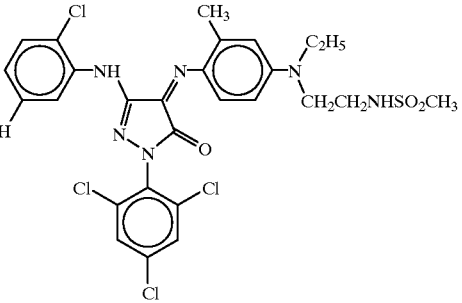

Anionic surface active agent-1

(Preparation of Coating Liquid for Dye Layer)

The coating liquid was prepared so that the resultant dye layer might contain the following compounds in the amounts described below (amount of each component was based on the layer provided on a single face).

| | |
|---|---|
| Gelatin | 0.25 g/m$^2$ |
| Compound A-8 | 1.4 mg/m$^2$ |
| Sodium polystyrenesulfonate | 5.9 mg/m$^2$ |
| (average molecular weight: 600,000) | |
| Dye dispersion A (used as a dye) | shown in Table 1 |

Compound A-8 in the above is shown below:

Compound A-8

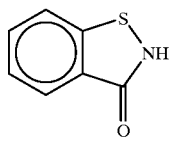

Dye dispersion A in the above was prepared in the following manner.
(Preparation of Dye dispersion A)

Each dye shown in Table 1 was not dried, but treated in the form of wet-cake. 2.5 mmol of each dye, 1.2 cc of 25 wt. % aqueous solution of Dispersing aid V (shown below) and water were mixed to prepare 32 g of a slurry. The prepared slurry and 120 g of zirconia beads (mean diameter: 1 mm) were placed in a vessel, and then dispersed for 6 hours using a mixer (1/16G sand grinder mill, available from Eyemex Co., Ltd.). Water was then added so that the content of the dye might be 2 wt. %, to prepare a dye dispersion.

Following the above, a photographic gelatin was added into the prepared dispersion so that the solid dye and the photographic gelatin might be incorporated in the same amount (5 wt. %). The antiseptic (Additive D shown below) and distilled water were further added so that the amount of Additive D might be 2,000 ppm per that of gelatin. After that, the resulting emulsion was cooled to store in the form of jelly.

Thus, Dye dispersion A containing dispersed solid fine particles was prepared. The mean particle size of the solid fine particles was 0.4 µm (in the case of F-16).

Dispersing aid V

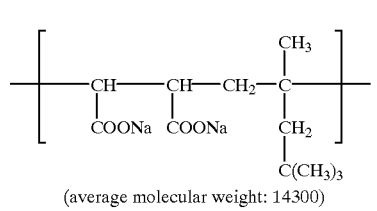

(average molecular weight: 14300)

Additive D

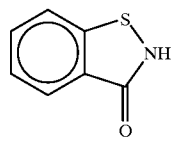

(Preparation of Coating Liquid for Surface Protective Layer)

The coating liquid was prepared so that the resultant surface protective layer might contain the following compounds in the amounts described below.

| | |
|---|---|
| Gelatin | 0.780 g/m² |
| Sodium polyacrylate | 0.025 g/m² |
| (average molecular weight: 400,000) | |
| Sodium polystyrenesulfonate | 0.0012 g/m² |
| (average molecular weight: 600,000) | |
| Matting agent 1 | 0.072 g/m² |
| (average particle size: 3.7 µm) | |
| Matting agent 2 | 0.010 g/m² |
| (average particle size: 0.7 µm) | |
| Compound A-9 | 0.018 g/m² |
| Compound A-10 | 0.037 g/m² |
| Compound A-11 | 0.0068 g/m² |
| Compound A-12 | 0.0032 g/m² |
| Compound A-13 | 0.0012 g/m² |
| Compound A-14 | 0.0022 g/m² |
| Compound A-15 | 0.030 g/m² |
| Proxcell (available from ICI) | 0.0010 g/m² |
| NaOH (with which pH was adjusted at 6.8) | |

Matting agents 1 and 2, and Compounds A-9 to A-15 in the above are as follows:

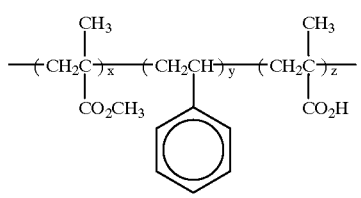

Compound A-9

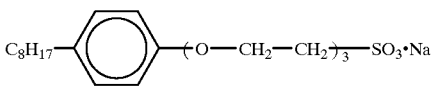

Compound A-10

$C_{18}H_{33}O-(CH_2CH_2O)_{\overline{10}}H$

Compound A-11

Compound A-12

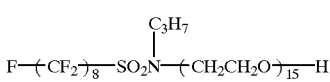

Compound A-13

Compound A-14

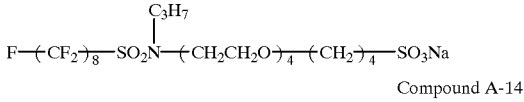

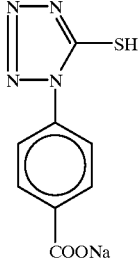

Compound A-15

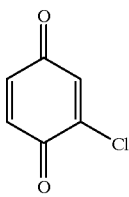

Compound A-18

$C_{12}H_{25}O(CH_2CH_2O)_{10}H$

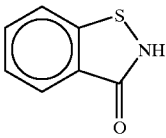

(Preparation of Support)

(1) Formation of First Undercoating Layer

The surface of a biaxially stretched polyethylene terephthalate film (thickness: 175 $\mu$m) containing Dye-1 (shown above) in an amount of 0.04 wt. % was subjected to corona discharge treatment. Onto one surface of the film, the following coating liquid was applied in the amount of 4.9 cc/m$^2$ by a wire-converter. The coated liquid was then dried at 185° C. for 1 minute to form a first undercoating layer. Also onto the other surface, a first undercoating layer was formed in the same manner as described above.

(Coating liquid for first undercoating layer)

| | |
|---|---|
| Solution of butadiene-styrene copolymer latex (solid content: 40%, weight ratio of butadiene/styrene: 31/69) | 158 mL |
| 4 Wt. % 2,4-dichloro-6-hydroxy-s-triazine sodium salt solution | 41 mL |
| Distilled water | 801 mL |

In the above latex solution, Compound A-16 (shown below, emulsifier) was added in an amount of 0.4 wt. % per the solid content of the latex.

Compound A-16

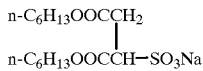

(2) Formation of Second Undercoating Layer

Onto each of the first undercoating layers formed on both surfaces of the support, the coating liquid having the following components in the amounts described below was applied (amount of each component was based on the liquid for coating a single layer) by a wire-bar coater, and then dried at 155° C. to form a second undercoating layers. The amount of the liquid for coating a single layer was 7.9 cc/m$^2$.

| | |
|---|---|
| Gelatin | 0.06 g/m$^2$ |
| Dye dispersion B (used as a dye for a single layer) | shown in Table 1 |
| Compound A-17 | 1.8 g/m$^2$ |
| Compound A-18 | 0.27 g/m$^2$ |
| Matting agent (polymethyl methacrylate having the mean particle size of 2.5 $\mu$m) | 2.5 g/m$^2$ |

Dye dispersion B in the above was prepared in the same manner as Dye dispersion A.

Compounds A-17 and A-18 are shown below:

Compound A-17

$C_{12}H_{25}O(CH_2CH_2O)_{10}H$ (Preparation of Photographic Material)

Each surface of the support prepared above was simultaneously and superposingly coated with the above prepared coating liquids by an extruding method, and then the coated liquids were dried to prepare a photographic material (Sample 1) comprising a support, a dye layer, an emulsion layer and a surface protective layer overlaid in order. The amount of silver provided on a single surface was 1.5 g/m$^2$.

(Measurement of Swelling Ratio)

After storing at 40° C. (60%RH) for 7 days, the above photographic material (Sample 1) was soaked in distilled water at 21° C. for 3 minutes and then frozen using liquid nitrogen. The frozen material was cut perpendicularly to the surface by means of a microtome, and then freezedried at −90° C. The section of the thus treated material was observed by means of a scanning electron microscope, to measure the thickness (Tw) of the swelled sample. Independently, the section of the dry sample was also observed by means of a scanning electron microscope, to measure the thickness (Td). Based on thus obtained Tw and Td, the swelling ratio was calculated in accordance with the following formula:

$$\text{Swelling ratio (\%)} = \{(Tw-Td)/Td\} \times 100.$$

The values of Sample 1 were as follows: Td=2.7 $\mu$m, Tw=7.0 $\mu$m, and the swelling ratio=159%.

Measurement of Absorption Spectrum of Dye in Dye Layer and/or Undercoating Layer In order to measure the absorption spectrum of the dye contained in the dye layer and/or the undercoating layers of Sample 1, the above procedure was repeated except for providing no emulsion layers to produce a sample comprising the same layers as those of Sample 1 except for the emulsion layers.

The absorption spectrum of thus produced sample was measured by means of a normal automatic recording spectrophotometer equipped with an integrating sphere. In the measurement, a polyethylene terephthalate film was used as a reference. The results (wavelength of the maximum peak, the ratio of the absorption coefficient at 550 nm to that at 450 nm) are set forth in Table 1.

TABLE 1

| sample No. | dye layer | | u.c. layer[1] | | peak (nm) | ratio[2] |
|---|---|---|---|---|---|---|
| | dye | amount[3] | dye | amount[3] | | |
| 1 | F-16 | 24 mg/m$^2$ | — | | 555 | 5.3 |
| 2 | F-16 | 34 mg/m$^2$ | — | | 555 | 5.3 |
| 3 | F-16 | 46 mg/m$^2$ | — | | 555 | 5.3 |
| 4 | F-16 | 14 mg/m$^2$ | — | | 555 | 5.3 |
| 5 | F-16 | 8 mg/m$^2$ | — | | 555 | 5.3 |
| 6 | — | | F-3 | 14 mg/m$^2$ | 550 | 4.5 |
| 7 | F-3 | 20 mg/m$^2$ | F-3 | 20 mg/m$^2$ | 550 | 4.5 |
| 8 | F-19 | 50 mg/m$^2$ | — | | 530 | 1.5 |
| 9 | — | | F-19 | 20 mg/m$^2$ | 530 | 1.5 |

TABLE 1-continued

| sample | dye layer | | u.c. layer[1] | | peak | |
|---|---|---|---|---|---|---|
| No. | dye | amount[3] | dye | amount[3] | (nm) | ratio[2] |

Remarks:
[1]"u.c. layer" stands for the undercoating layer.
[2]"ratio" stands for the ratio of the absorption coefficient at 550 nm to that at 450 nm.
[3]The amount in the above is that of the dye included in the layer provided on a single face of the support.

[Evaluation 1 of Combination of Radiographic Intensifying Screen and Silver Halide Photographic Material]

The sample of silver halide photographic material (Sample 1) produced in the above described manner was evaluated in combination with each of Screens A to D, and X to Z.

(Exposure to X-rays)

The photographic material was placed in contact with the surface of the screen, and then an X-ray generator (X-ray tube), a photographic material and an intensifying screen were arranged in order. In this arrangement, the photographic material was stepwise exposed to X-rays at different doses (which are adjusted by varying the distance between the screen and the X-ray tube). The dose was varied by the step width of logE=0.15. The used X-ray tube was DRX-3724HD [trade name], available from Toshiba Corporation, in which X-rays were generated by tungsten target and a pulse generator (80 KVp, three-phase), and then passed through 3 mm thick aluminum equivalent material including aperture to make the focal spot size of 0.6 mm×0.6 mm. The X-rays generated from the tube were made to pass through a filter of water having the pass of 7 cm (which absorbs X-rays in nearly the same amount as a human body).

(Development of Photographic Material)

The exposed photographic material was developed in a developing agent (CED2 [trade name], available from Fuji Photo Film Co., Ltd.) and fixed in a fixing agent (CEF2 [trade name], available from Fuji Photo Film Co., Ltd.) by means of a roller conveyor automatic developing machine (CEPROS-M2 [trade name], available from Fuji Photo Film Co., Ltd.) for 45 seconds (dry-to-dry: SP mode). Each of the developing agent and the fixing agent was supplied in an amount of 10 cc per a 10×12 inch size.

1) The developed material was divided into two sheets. From one sheet, the emulsion layer not having been in contact with the intensifying screen was removed by enzyme treatment. The optical density of the emulsion layer remaining on the support was measured to determine the sensitivity of the intensifying screen. The results are expressed in relative values in which the sensitivity of screen Z is set at 100.

2) From another sheet, the emulsion layer having been in contact with the intensifying screen was removed. The optical density of the emulsion layer remaining on the support was measured to determine the sensitivity, and then the difference between the determined sensitivity and that determined in the above 1) was calculated. Based on the obtained difference, the degree of cross-over is determined in accordance with the aforementioned equation.

The results are set forth in Table 2.

TABLE 2

| screen | amount of dye (mg/phosphor 1 kg) | | sensitivity | cross-over (%) |
|---|---|---|---|---|
| (Examples) | | | | |
| A | f.dye[1] No.25 | 40 mg | 105 | 7.5 |
| B | f.dye[1] No.25 | 120 mg | 108 | 7 |
| C | f.dye[1] No.25 | 15 mg | 100 | 8.5 |
| D | f.dye[1] No.23 | 60 mg | 105 | 8 |
| (Comparison Examples) | | | | |
| X | yellow dye | 40 mg | 95 | 10.5 |
| Y | yellow dye | 120 mg | 85 | 8 |
| Z | — | | 100 | 12 |

Remark: [1]"f.dye" stands for fluorescent dye.

The results in Table 2 indicate that each of the intensifying screens according to the invention (Screens A, B, C and D) has a high sensitivity and gives a low cross-over (consequently, gives an image of high sharpness). Particularly, Screen B exhibited the highest sensitivity and the lowest cross-over. In contrast, the intensifying screens for comparison (screens containing a conventional absorbing dye) exhibited a low sensitivity although they reduced cross-over. The results shown in Table 2 are expected before on the basis of the emission spectra shown in FIGS. 1–3.

EXAMPLE 2

Production of Silver Halide Photographic Materials (Samples 2–5)

The procedures of Example 1 were repeated except that the dye was incorporated into the dye layer in the amount shown in Table 1, to produce each of the silver halide photographic materials (Samples 2 to 5).

[Evaluation 2 of Combination of Radiographic Intensifying Screen and Silver Halide Photographic Material]

With respect to each combination shown in Table 3, the sensitivity and the cross-over were measured in the same manner as described in Evaluation 1. The results are set forth in Table 3.

TABLE 3

| material | screen | sensitivity | cross-over (%) |
|---|---|---|---|
| (Examples) | | | |
| Sample 1 | B | 108 | 7 |
| Sample 2 | B | 108 | 5 |
| Sample 3 | B | 108 | 2 |
| Sample 4 | B | 108 | 11 |
| Sample 5 | B | 108 | 17 |
| (Comparison Examples) | | | |
| Sample 1 | Z | 100 | 12 |
| Sample 2 | Z | 100 | 10 |
| Sample 3 | Z | 100 | 7 |
| Sample 4 | Z | 100 | 14 |
| Sample 5 | Z | 100 | 18 |

The above results indicate that each combination of the invention (which comprises the photographic material and the intensifying screen containing a fluorescent dye) effectively reduces the cross-over without lowering the sensitivity.

Table 3 confirms that the intensifying screen is advantageously combined with the photographic material giving a cross-over in a degree of not less than 10%.

EXAMPLE 3

Production of Silver Halide Photographic Materials (Samples 6–9)

The procedures of Example 1 were repeated except that the dye was incorporated into the dye layer and/or the undercoating layer in the amounts shown in Table 1, to produce each of the silver halide photographic materials (Samples 6 to 9).

[Evaluation 3 of Combination of Radiographic Intensifying Screen and Silver Halide Photographic Material]

With respect to each combination shown in Table 4, the sensitivity and the cross-over were measured in the same manner as described in Evaluation 1. The results are set forth in Table 4.

TABLE 4

| material | screen | sensitivity | cross-over (%) |
|---|---|---|---|
| (Examples) | | | |
| Sample 6 | D | 105 | 10 |
| Sample 7 | D | 105 | 3 |
| Sample 8 | D | 105 | 5 |
| Sample 9 | D | 105 | 12 |
| (Comparison Examples) | | | |
| Sample 6 | X | 100 | 14 |
| Sample 7 | X | 100 | 9 |
| Sample 8 | X | 100 | 7 |
| Sample 9 | X | 100 | 14 |

The above results indicate that each combination of the invention effectively reduces the cross-over without lowering the sensitivity. In particular, according to Tables 1 and 4, the photographic material having a large ratio of the absorption coefficient at 550 nm to that at 450 nm remarkably reduces the cross-over.

EXAMPLE 4

Production of Radiographic Intensifying Screens E to I (1) The procedures of Example 1 were repeated except for the following. In the procedure, the amount of the coating liquid for phosphor layer was changed so that the layer might have a thickness of 80 μm after calender treatment. Thus, the screen containing the fluorescent dye was prepared (Screen E).

(2) The procedures of Example 1 were repeated except for the following. In the procedure, 50 g of the phosphor particles having an average particle size of 2.0 μm and 200 g of those having an average particle size of 6.2 μm were incorporated (chemical composition of the phosphor was not changed), and the amount of the coating liquid for phosphor layer was changed so that the layer might have a thickness of 120 μm after calender treatment. Thus, the screen according to the invention was prepared (Screen F). The volume filling content of the phosphor in the phosphor layer was 72%.

(3) The procedures of the above (2) were repeated except for the following. In the procedure, the amount of the coating liquid for phosphor layer was changed so that the layer might have a thickness of 95 μm after calender treatment. Thus, the screen according to the invention was prepared (Screen G).

(4) The procedures of Example 1 were repeated except for the following. The phosphor layer was formed by superposingly providing two component layers in which one component layer (lower component layer) contained the phosphor particles (chemical composition of the phosphor was not changed) having the average particle size of 3.0 μm (variation coefficient: 45%) and the other component layer (upper component layer) contained those having an average particle size of 6.2 μm (variation coefficient: 30%). The lower and the upper component layers had thicknesses of 80 μm and 100 μm, respectively, after calender treatment. Thus, the intensifying screen according to the invention was prepared (Screen H). The volume filling content of the phosphor in the phosphor layer was 70%.

(5) The procedures of Example 1 were repeated except for the following. The phosphor layer was formed by superposingly providing two component layers in which one component layer (lower component layer) contained the phosphor particles (chemical composition of the phosphor was not changed) having an average particle size of 3.0 μm (variation coefficient: 40%) and the other component layer (upper component layer) contained those having an average particle size of 6.2 μm (variation coefficient: 30%). The lower and the upper component layers had thicknesses of 80 μm and 240 μm, respectively, after calender treatment. Thus, the intensifying screen according to the invention was prepared (Screen I).

Production of Silver Halide Photographic Material (Sample 10)

The procedures for preparing Emulsion A were repeated except for changing the conditions (such as the temperature for forming the particles and the conditions for chemical sensitization) to prepare a monodispersed {111} tabular silver iodobromide emulsion (Emulsion B). The particles of the silver iodobromide had the following characteristic values on the shape.

a2: [average aspect ratio (mean diameter/mean thickness) of {111} tabular particles having an aspect ratio of 2–30]=8.0, a3: [mean diameter of the circle corresponding to the projected area of {111} tabular particles having an aspect ratio of 2–30]=0.6 μm, a4: [mean thickness of {111} tabular particles having an aspect ratio of 2–30]=0.07 μm, and variation coefficient of diameters of the circles corresponding to the projected area=18%.

The procedures of Example 2 were repeated except for the following. In the procedure, the dye F-16 was incorporated into the dye layer in an amount of 50 mg/m$^2$ (based on the layer provided on a single face) and the emulsion layer was formed by superposingly applying Emulsions A and B. Thus prepared photographic material (Sample 10) exhibits almost the same sensitivity and contrast as those of a commercially available radiographic film (UR2 [trade name], available from Fuji Photo Film Co., Ltd.).

Production of Radiographic Intensifying Screens P to T for Comparison

Each procedure of (1) to (5) in Example 4 was repeated except for not adding the fluorescent dye No. 25, to produce each of the screens for comparison (Screens P, Q. R, S and T).

[Evaluation 4 of Combination of Radiographic Intensifying Screen and Silver Halide Photographic Material]

A pair of intensifying screens shown in Table 5 and Sample 10 were combined to give a combination so that each of the screens might be in contact with each surface of Sample 10. Thus prepared combinations are shown in Table 5. In Table 5, the intensifying screen placed on the side near the X-ray generator is referred to as "front screen" and that on the opposite side is referred to as "back screen".

Each combination was exposed to X-ray, and then developed to measure the sensitivity in the manner described in Evaluation 1. The results are expressed in relative values in which the sensitivity of the pair of Screens P and Q is set at 100.

In order to determine the sharpness, a radiographic image of a rectangular chart for measuring MFT (made of molybdenum, thickness: 80 μm, spatial frequency 0–10 1p/mm) was obtained. The chart was placed in front of an X-ray tube at distance of 2 m. The dose of X-rays in the exposure process was determined so that the average difference between the highest and the lowest density of the developed image might be 1.0.

The density of the radiographic image of the developed sample was measured to obtain a density profile by means of a microdensitometer under the condition that the aperture was a slit of 30 μm×500 μm (scanning direction×vertical direction) and the sampling distance was 30 μm. This procedure was repeated twenty times and the obtained values were averaged to obtain a density profile on which CTF was calculated. Thereafter, the peak corresponding to the pulse of each spatial frequency in the density profile was observed to calculate a density contrast of each frequency. The calculated density contrast was then normalized with the density difference at a frequency of 0 to obtain the value of CTF (2 1p/mm) indicating the degree of sharpness.

The obtained values concerning sensitivity and sharpness (CTF) were set forth in Table 5.

TABLE 5

| material | front screen | back screen | sensitivity | sharpness (CTF) |
|---|---|---|---|---|
| (Examples) | | | | |
| Sample 10 | E | F | 104 | 0.610 |
| Sample 10 | G | H | 140 | 0.53 |
| Sample 10 | G | I | 210 | 0.37 |
| (Comparison Examples) | | | | |
| Sample 10 | P | Q | 100 | 0.585 |
| Sample 10 | R | S | 130 | 0.510 |
| Sample 10 | R | T | 190 | 0.36 |
| UR-2 | HGM2 | HGM2 | 100 | 0.500 |

The results shown in Table 5 indicate that the combination of the intensifying screen according to the invention (i.e., each of Screens E-I) and Sample 10 (a photographic material according to the invention) has a high sensitivity and gives an image of high sharpness.

EXAMPLE 5

Production of Silver Halide Photographic Material (Samples 11 and 12)

The procedures for producing Sample 10 in Example 4 were repeated except for changing the sensitivity of emulsion, to prepare two photographic materials (Samples 11 and 12) according to the invention. Samples 11 and 12 had the same structure, sensitivity and contrast as those of UR-1 and UR-3 ([trade name], available from Fuji Photo Film Co., Ltd.), respectively.

[Evaluation 5 of Combination of Radiographic Intensifying Screen and Silver Halide Photographic Material]

Each of the above produced photographic materials (Samples 11 and 12) was evaluated in combination with a pair of screens in the same manner as described in Evaluation 4, to obtain satisfying results like those shown in Table 5.

[Evaluation 6 of Combination of Radiographic Intensifying Screen and Silver Halide Photographic Material]

The photographic materials produced in Examples 4 and 5 were developed by means of an automatic developing machine CEPROS-30, CEPROS-S or CEPROS-P in place of CEPROS-M2 ([trade names], available from Fuji Photo Film Co., Ltd.) for 30, 60 or 120 seconds (dry-to-dry), to obtain images of high quality exhibiting no residual color. In this developing process, the following treatment solutions were used.

(Preparation of Developing Solution)

The developing solution consisting of the following components was prepared. The components were as follows:

| | |
|---|---|
| Ethylenediaminepentaacetic acid | 8.0 g |
| Sodium sulfite | 20.0 g |
| Sodium carbonate monohydrate | 52.0 g |
| Potassium carbonate | 55.0 g |
| Sodium erysorbic acid | 60.0 g |
| 4-Hydroxymethyl-4-methyl-1-phenyl-3-pyrazolidone | 13.2 g |
| 3,3'-Diphenyl-3,3'-dithiopropionic acid | 1.44 g |
| Diethylene glycol | 50.0 g |

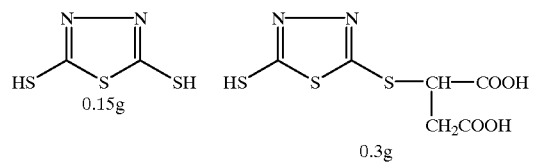

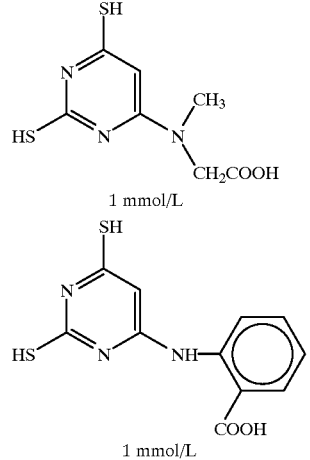

and water to adjust the volume to 2 litters, and then the value of pH was adjusted to 10.1 with sodium hydroxide.

(Preparation of Supplementary Developing Solution)

The above developing solution was also used as a supplementary developing solution.

(Preparation of Developing Mother Solution)

Into 2 litters of the above developing solution, the following starter was added in an amount of 55 mL per 1 litter of the developing solution, to prepare developing mother solution (pH: 9.5).

(Preparation of Starter)

The starter consisting of the following components was prepared. The components were as follows:

| | |
|---|---|
| Potassium bromide | 11.1 g |
| Acetic acid | 10.8 g | and water to adjust the volume to 55 mL.

(Preparation of Condensed Fixing Solution)

The condensed fixing solution consisting of the following components was prepared. The components were as follows:

| | |
|---|---|
| Water | 0.5 litter |
| Ethylenediaminetetraacetic acid dihydrate | 0.05 g |
| Sodium thiosulfate | 200 g |
| Sodium bisulfite | 98.0 g |
| Sodium hydroxide | 2.9 g |

And the value of pH was adjusted to 5.2 with sodium hydroxide, and then water was added to adjust the volume to 1 litter.

(Preparation of Supplementary Fixing Solution)

The above condensed fixing solution was diluted twice with first drained wash-water, to prepare a supplementary fixing solution.

(Preparation of Fixing Mother Solution)

Two litters of the above condensed fixing solution was diluted with water to adjust the volume to 4 litters. The value of pH was 5.4.

(Preparation of Supplementary Wash-Water)

The supplementary wash-water was prepared in the following manner.

| | |
|---|---|
| Glutaric aldehyde | 0.3 g, and |
| Diethylenetriaminepentaacetic acid | 0.5 g | were dissolved in distilled water, and then the value of pH was adjusted to 4.5 with sodium hydroxide. Then, distilled water was further added to adjust the volume to 1 litter.

EXAMPLE 6

Production of Radiographic Intensifying Screens J to M

The procedures of Example 1 were repeated except for using each of the phosphors shown in Table 6 in the corresponding amount, to produce a radiographic intensifying screens (Screen J to M) according to the invention.

[Evaluation 7 of Combination of Radiographic Intensifying Screen and Silver Halide Photographic Material]

With respect to the sensitivity and the cross-over, the combination of each intensifying screen shown in Table 6 and the photographic material (Sample 2) was evaluated in the same manner as described in Evaluation 1. The results are set forth in Table 6. Table 6 shows a maximum wavelength and a half-width of the luminescence emitted by the fluorescence dye contained in each intensifying screen excited at 417 nm.

TABLE 6

| screen[1] | amount of dye (mg/phosphor 1 kg) | w.l.[2] (nm) | h.w.[3] | sens.[4] | c.o.[5] (%) |
|---|---|---|---|---|---|
| (Examples) | | | | | |
| J | f.dye[6] No.51  120 mg | 540 | 75 | 101 | 6 |
| K | f.dye[6] No.47  120 mg | 490 | 82 | 95 | 8 |
| L | f.dye[6] No.23  120 mg | 513 | 63 | 106 | 6 |
| M | f.dye[6] No.48  120 mg | 524 | 83 | 103 | 6 |
| B | f.dye[6] No.25  120 mg | 520 | 58 | 108 | 5 |
| (Comparison Examples) | | | | | |
| Z | — | — | — | 100 | 10 |
| Y | yellow dye  120 mg | — | — | 85 | 6 |

Remarks:
[1] Every screen was combined with Sample 2.
[2] "w.l." stands for the maximum wavelength.
[3] "h.w." stands for the half-width.
[4] "sens." stands for the sensitivity.
[5] "c.o." stands for the cross-over.
[6] "f.dye" stands for fluorescent dye.

The results in Table 6 indicate that the combination of the intensifying screen according to the invention (i.e., each of Screens B and J-M) and Sample 2 (a photographic material according to the invention) has a high sensitivity and gives an image of high sharpness.

According to Table 6, a particularly preferred image of a low cross-over can be given with a high sensitivity by the intensifying screen containing the fluorescent dye which emits a luminescence having the maximum peak in the wavelength region of 500 to 555 nm. If the maximum peak shifts to a shorter wavelength, the luminescence emitted by the fluorescent dye does not effectively enhance the sensitivity. This fact can be expected on the basis of the spectral sensitivity shown in FIG. 5.

In contrast, if the fluorescent dye emits a luminescence having the peak at a longer wavelength, its excitation spectrum (absorption spectrum) accordingly shifts to a longer wavelength, and hence the dye absorbs an effective portion of the emission (maximum peak: 545 nm) of $Gd_2O_2S$:Tb phosphor. Consequently, the intensifying screen containing such fluorescent dye (e.g., Screen J) is liable to lower in the sensitivity. However, if the absorption spectrum does not shift (in other words, if proper Stokes' shift is ensured), the peak of luminescence emitted by the fluorescent dye preferably is close to 545 nm where the photographic material has a relatively high spectral sensitivity.

The results in Table 6 also indicate that the fluorescent dye emitting luminescence of a narrow half-width gives a high sensitivity.

Figure 6:
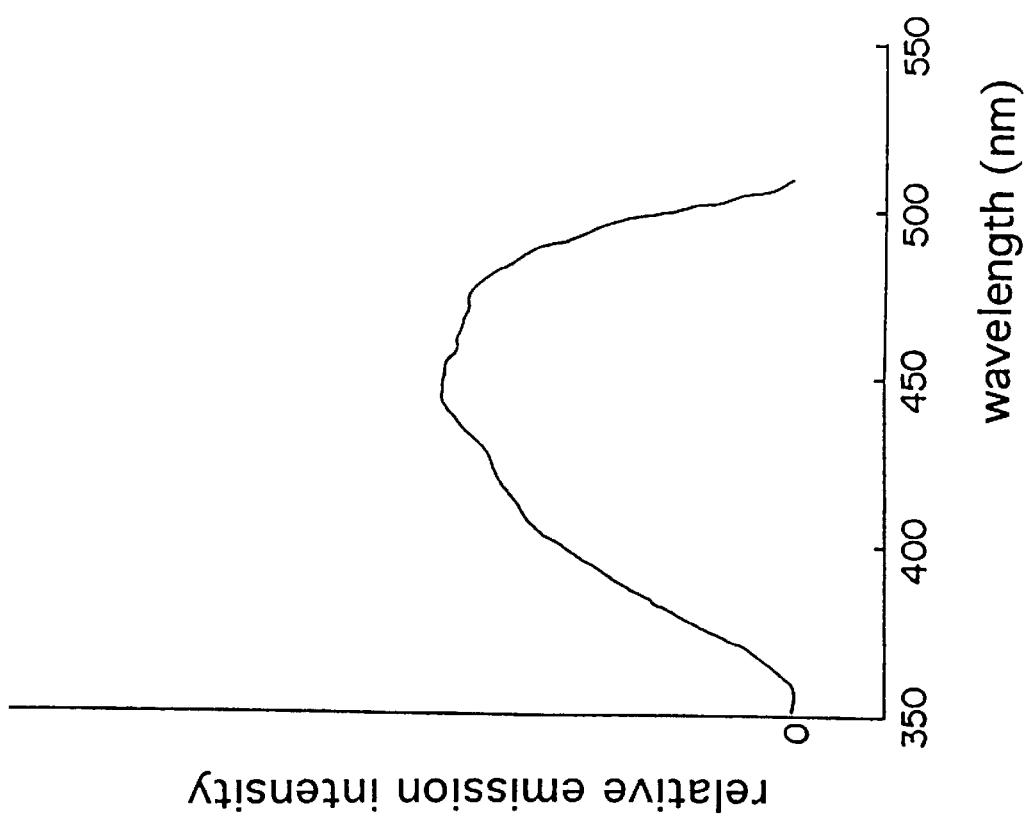
FIG. 6 shows an excitation spectrum of the radiographic intensifying screen of FIG. 1 (an absorption spectrum of the fluorescent dye) observed when the intensifying screen is caused to emit luminance at 520 nm.

FIG. 6 shows the excitation spectrum of Screen B (i.e., the absorption spectrum of the fluorescent dye in Screen B) monitored at 520 nm. According to FIG. 6, the fluorescent dye contained in Screen B (i.e, coumarin-6) well absorbs a light in the wavelength region of 380 to 500 nm while it does not at a wavelength near 545 nm. Since Screen B exhibits excellent properties, the fluorescent dye like coumarin-6 (which absorbs light in 380 to 500 nm and then emits luminescence of narrow halfwidth at near 545 nm) is particularly preferred.

EXAMPLE 7

Production of Radiographic Intensifying Screens B2 and 3

The procedures for producing Screen B in Example 1 were repeated except for using $Gd_2O_2S$:Tb phosphor containing the amount of Tb as shown in Table 7, to produce each radiographic intensifying screen according to the invention (Screens B2 and B3).

Production of Radiographic Intensifying Screens Z2 and Z3 for Comparison

The procedures for producing Screen Z in Example 1 were repeated except for using $Gd_2O_2S$:Tb phosphor including the amount of Tb as shown in Table 7, to produce each radiographic intensifying screen for comparison (Screens Z2 and Z3).

[Evaluation 8 of Combination of Radiographic Intensifying Screen and Silver Halide Photographic Material]

With respect to the sensitivity and the cross-over, the combination of each screen shown in Table 7 and the photographic material (Sample 2) was evaluated in the same manner as described in Evaluation 1. The results are set forth in Table 7.

TABLE 7

| screen[1] | amount of Tb (mol/1 mol Gd) | amount of dye (mg/phosphor 1 kg) | sens.[2] | c.o.[3] (%) |
|---|---|---|---|---|
| (Examples) | | | | |
| B | 0.003 | f.dye[4] No.25 120 mg | 108 | 5 |
| B2 | 0.0015 | f.dye[4] No.25 120 mg | 105 | 6 |
| B3 | 0.010 | f.dye[4] No.25 120 mg | 103 | 5 |
| (Comparison Examples) | | | | |
| Z | 0.003 | — | 100 | 10 |
| Z2 | 0.0015 | — | 92 | 13 |
| Z3 | 0.010 | — | 98 | 9 |

Remarks:
[1] Every screen was combined with Sample 2.
[2] "sens." stands for the sensitivity.
[3] "c.o." stands for the cross-over.
[4] "f.dye" stands for fluorescent dye.

The results in Table 7 indicate that the fluorescent dye according to the invention is effective even if the amount of the contained in $Gd_2O_2S$:Tb phosphor is varied. Further, according to Table 7, the fluorescent dye is particularly effective when the amount of Tb is in the range of 0.001 to 0.02.

EXAMPLE 8

The procedures of Example 1 were repeated except that a phosphor layer-forming coating dispersion was prepared by placing 250 g of $Gd_2O_2S$:Tb phosphor, 6 g of a polyurethane binder resin (Pandex T5265M, trade name), 1 g of an epoxy binder resin (Epikote 1001), 10 mg of Fluorescent No. 25, and 0.25 g of an isocyanate compound (Colonate HX) in methyl ethyl ketone. Thus, Radiographic Intensifying Screen A2 was prepared. Intensifying Screen A2 was evaluated in its radiographic characteristics in combination with Photographic Material (Sample 1). The results indicate that Intensifying Screen A2 has almost the same favorable characteristics as those of Intensifying Screen A.

EXAMPLE 9

The procedures of Example 4 for the preparation of Radiographic Intensifying Screens E, F, G, H and I were repeated except for decreasing the amount of binder to the same level of Example 8, to prepare Radiographic Intensifying Screens E2, F2, G2, H2, and I2. These Intensifying Screens were evaluated in its radiographic characteristics in combination with Photographic Material (Sample 10). The results indicate that these Intensifying Screens have almost the same favorable characteristics as those of Intensifying Screens of Example 4.

What is claimed is:

1. A combination for radiation image formation which comprises a silver halide photographic material having a support and at least one silver halide emulsion layer provided on each side of the support, and two radiographic intensifying screens each having a support and at least one phosphor layer provided thereon, wherein said phosphor layer contains a rare earth phosphor represented by the following formula:

in which M represents at least one rare earth atom selected from the group consisting of Y, La, Gd and Lu; X represents at least one chalcogen atom selected from the group consisting of S, Se and Te, or at least one halogen atom selected from the group consisting of F, Br, Cl and I; M' represents a rare earth atom which activates M; and w is 2 when X is a chalcogen atom or w is 1 when X is a halogen atom, said radiographic intensifying screen contains a fluorescent dye or pigment which absorbs a portion of luminescence emitted by the rare earth phosphor and then emits light in a visible region, and said photographic material shows a cross-over of 10% or less when it is placed between the two radiographic intensifying screens and exposed to radiation.

2. The combination of claim 1, wherein the rare earth phosphor in the radiographic intensifying screen is a terbium activated gadolinium oxysulfide phosphor.

3. The combination of claim 2, wherein the terbium activated gadolinium oxysulfide phosphor contains terbium atom in an amount of 0.001 to 0.02 mol. per 1 mol. of Gd.

4. The combination of claim 1, wherein the fluorescent dye or pigment shows a light absorption peak in a wavelength region of shorter than 500 nm and an emission peak in the wavelength range of 450 to 600 nm under the condition that the wavelength of emission peak is longer than the wavelength of light absorption peak by at least 10 nm.

5. The combination of claim 4, wherein the emission peak of the fluorescent dye or pigment has a halfwidth of 100 nm or less.

6. The combination of claim 1, wherein the fluorescent dye or pigment shows a light absorption peak in a wavelength region of 400 to 490 nm and an emission peak in the wavelength range of 500 to 600 nm.

7. The combination of claim 1, wherein the fluorescent dye or pigment in the radiographic intensifying screen is a carbocyanine dye, a xanthene dye, a triarylmethane dye, a coumarin dye, a phthalimide compound, a naphthalimide compound, a diketopyrrolopyrrole compound or a perylene compound.

8. The combination of claim 1, wherein the fluorescent dye or pigment in the radiographic intensifying screen is contained in the phosphor layer.

9. The combination of claim 1, wherein the silver halide photographic material contains a dye which shows a light absorption peak in the wavelength region of 500 to 600 nm.

10. The combination of claim 9, wherein the dye in the silver halide photographic material is decolorizable in a developing process.

11. The combination of claim 10, wherein the decolorizable dye shows an absorption coefficient at 550 nm which is twice or more larger than that at 450 nm.

12. The combination of claim 1, wherein the silver halide photographic material contains a dye in a layer provided on the support.

13. A radiation image-forming system comprising two radiographic intensifying screens each having a support and at least one phosphor layer provided thereon and a silver halide photographic material which is interposed between the two intensifying screens and has a support and at least one silver halide emulsion layer provided on each side of the support, wherein said phosphor layer contains a rare earth phosphor represented by the following formula:

$$M_w O_w X:M'$$

in which M represents at least one rare earth atom selected from the group consisting of Y, La, Gd and Lu; X represents at least one chalcogen atom selected from the group consisting of S, Se and Te, or at least one halogen atom selected from the group consisting of F, Br, Cl and I; M' represents a rare earth atom which activates M; and w is 2 when X is a chalcogen atom or w is 1 when X is a halogen atom, said radiographic intensifying screen contains a fluorescent dye or pigment which absorbs a portion of luminescence emitted by the rare earth phosphor and then emits light in a visible region, and said photographic material shows a cross-over of 10% or less when it is exposed to radiation in the system.

14. The radiation image-forming system of claim 13, wherein the rare earth phosphor in the radiographic intensifying screen is a terbium activated gadolinium oxysulfide phosphor.

15. The radiation image-forming system of claim 13, wherein the fluorescent dye or pigment shows a light absorption peak in a wavelength region of shorter than 500 nm and an emission peak in the wavelength range of 450 to 600 nm under the condition that the wavelength of emission peak is longer than the wavelength of light absorption peak by at least 10 nm.

16. The radiation image-forming system of claim 13, wherein the fluorescent dye or pigment shows a light absorption peak in a wavelength region of 400 to 490 nm and an emission peak in the wavelength range of 500 to 600 nm.

17. The radiation image-forming system of claim 13, wherein the silver halide photographic material contains a dye in a layer provided on the support, said dye showing a light absorption peak in the wavelength region of 500 to 600 nm and being decolorizable in a developing process.

18. A method for forming a radiation image which comprises the steps of:

forming a combination by placing a silver halide photographic material having a support and at least one silver halide emulsion layer provided on each side of the support between two radiographic intensifying screens each having a support and at least one phosphor layer provided thereon, said phosphor layer containing a rare earth phosphor represented by the following formula:

$$M_w O_w X:M'$$

in which M represents at least one rare earth atom selected from the group consisting of Y, La, Gd and Lu; X represents at least one chalcogen atom selected from the group consisting of S, Se and Te, or at least one halogen atom selected from the group consisting of F, Br, Cl and I; M' represents a rare earth atom which activates M; and w is 2 when X is a chalcogen atom or w is 1 when X is a halogen atom, said radiographic intensifying screen containing a fluorescent dye or pigment which absorbs a portion of luminescence emitted by the rare earth phosphor and then emits light in a visible region, and said photographic material showing a cross-over of 10% or less when it is exposed to X-ray radiation;

imagewise exposing the combination to X-ray radiation;

separating the exposed photographic material from the intensifying screens; and developing the exposed photographic material in a developing solution.

19. The method of claim 18, wherein the rare earth phosphor in the radiographic intensifying screen is a terbium activated gadolinium oxysulfide phosphor.

20. The method of claim 18, wherein the fluorescent dye or pigment shows a light absorption peak in a wavelength region of shorter than 500 nm and an emission peak in the wavelength range of 450 to 600 nm under the condition that the wavelength of emission peak is longer than the wavelength of light absorption peak by at least 10 nm.

21. The method of claim 18, wherein the fluorescent dye or pigment shows a light absorption peak in a wavelength region of 400 to 490 nm and an emission peak in the wavelength range of 500 to 600 nm.

22. The method of claim 18, wherein the silver halide photographic material contains a dye in a layer provided on the support, said dye showing a light absorption peak in the wavelength region of 500 to 600 nm and being decolorizable in the developing step.

* * * * *